United States Patent
Császár

(10) Patent No.: US 9,628,285 B2
(45) Date of Patent: *Apr. 18, 2017

(54) INCREASING FAILURE COVERAGE OF MOFRR WITH DATAPLANE NOTIFICATIONS

(71) Applicant: Telefonaktiebolaget L M Ericsson (publ), Stockholm (SE)

(72) Inventor: András Császár, Telki (HU)

(*) Notice: Subject to any disclaimer, the term of this patent is extended or adjusted under 35 U.S.C. 154(b) by 270 days.

This patent is subject to a terminal disclaimer.

(21) Appl. No.: 14/631,549

(22) Filed: Feb. 25, 2015

(65) Prior Publication Data

US 2015/0172070 A1  Jun. 18, 2015

Related U.S. Application Data

(63) Continuation-in-part of application No. 14/333,327, filed on Jul. 16, 2014, now Pat. No. 9,197,547, which
(Continued)

(51) Int. Cl.
*H04L 12/26* (2006.01)
*H04L 12/18* (2006.01)
(Continued)

(52) U.S. Cl.
CPC ...... *H04L 12/1863* (2013.01); *H04L 41/0668* (2013.01); *H04L 45/28* (2013.01); *H04L 45/16* (2013.01); *H04L 45/22* (2013.01)

(58) Field of Classification Search
CPC ....... H04L 12/18; H04L 12/24; H04L 12/703; H04L 12/707
See application file for complete search history.

(56) References Cited

U.S. PATENT DOCUMENTS 7,660,235 B2  2/2010  Alicherry et al.
8,102,848 B1  1/2012  Rao
(Continued)

FOREIGN PATENT DOCUMENTS

EP  2134031 A1  12/2009
EP  2592793     5/2013
(Continued)

OTHER PUBLICATIONS

U.S. Appl. No. 14/543,528, Non-Final Office Action, Jun. 30, 2015, 27 pages.
(Continued)

*Primary Examiner* — Yemane Mesfin
*Assistant Examiner* — Abdelillah Elmejjarmi
(74) *Attorney, Agent, or Firm* — Nicholson, De Vos, Webster & Elliot, LLP

(57) ABSTRACT

A computing device or control plane device functioning as or implementing the functions of a network node in a multicast communication network. The multicast communication network includes a multicast tree to provide connectivity from a common source node to one or more multicast recipient nodes. The multicast communication network further includes a set of secondary paths to provide redundancy to the multicast tree. The computing device executes a plurality of virtual machines for implementing network function virtualization (NFV), wherein a virtual machine from the plurality of virtual machines is configured to implement a method for an enhanced fast re-route mechanism to provide increased failure coverage to the multicast communication network.

20 Claims, 10 Drawing Sheets

Related U.S. Application Data is a continuation of application No. 13/486,470, filed on Jun. 1, 2012, now Pat. No. 8,824,276.

(51) Int. Cl.
*H04L 12/703* (2013.01)
*H04L 12/24* (2006.01)
*H04L 12/707* (2013.01)
*H04L 12/761* (2013.01)

(56) References Cited

U.S. PATENT DOCUMENTS

| | | | |
|---|---|---|---|
| 8,510,551 | B1 | 8/2013 | Desai et al. |
| 8,638,659 | B2 | 1/2014 | Csaszar et al. |
| 8,913,482 | B2 | 12/2014 | Csaszar et al. |
| 2002/0186652 | A1 | 12/2002 | Popovich |
| 2005/0111351 | A1 | 5/2005 | Shen |
| 2006/0159009 | A1 | 7/2006 | Kim et al. |
| 2006/0209826 | A1 | 9/2006 | Kawamura |
| 2007/0237072 | A1 | 10/2007 | Scholl |
| 2007/0237085 | A1* | 10/2007 | Tirumalai ............ H04Q 3/0087 370/242 |
| 2007/0253416 | A1 | 11/2007 | Raj |
| 2008/0031130 | A1 | 2/2008 | Raj et al. |
| 2008/0056123 | A1 | 3/2008 | Howard et al. |
| 2008/0107017 | A1 | 5/2008 | Yuan et al. |
| 2009/0201803 | A1 | 8/2009 | Filsfils et al. |
| 2009/0252033 | A1 | 10/2009 | Ramakrishnan et al. |
| 2009/0303996 | A1 | 12/2009 | Takase et al. |
| 2010/0014528 | A1 | 1/2010 | Amir et al. |
| 2010/0251037 | A1 | 9/2010 | Cao et al. |
| 2011/0019534 | A1 | 1/2011 | Ramakrishnan et al. |
| 2011/0063973 | A1 | 3/2011 | Venkataraman et al. |
| 2011/0110224 | A1 | 5/2011 | Nakash |
| 2011/0158082 | A1 | 6/2011 | Barkai et al. |
| 2012/0020207 | A1 | 1/2012 | Corti et al. |
| 2012/0033672 | A1 | 2/2012 | Page et al. |
| 2012/0039164 | A1 | 2/2012 | Enyedi et al. |
| 2015/0071055 | A1 | 3/2015 | Csaszar et al. |

FOREIGN PATENT DOCUMENTS

| | | |
|---|---|---|
| JP | 2006229740 A | 8/2006 |
| JP | 2009296493 A | 12/2009 |
| JP | 2010045732 A | 2/2010 |
| WO | WO-2005018175 | 2/2005 |
| WO | WO-2012003743 | 1/2012 |

OTHER PUBLICATIONS

U.S. Appl. No. 14/543,528, Final Office Action, Nov. 18, 2015, 31 pages.
RFC 768: Postel, "User Datagram Protocol," Aug. 28, 1980, 3 pages, Network Working Group, Request for Comments: 768.
RFC 793: "Transmission Control Protocol, DARPA Internet Program Protocol Specification," Sep. 1981, 91 pages, Network Working Group, Request for Comments: 793.
RFC 1058: Hedrick, "Routing Information Protocol," Jun. 1988, 33 pages, Network Working Group, Request for Comments: 1058.
RFC 1142: Oran, "OSI IS-IS Intra-domain Routing Protocol," Feb. 1990, 157 pages, Network Working Group, Request for Comments: 1142.
RFC 1180: Socolofsky, et al., "A TCP/IP Tutorial," Jan. 1991, 28 pages, Network Working Group, Request for Comments: 1180.
RFC 2080: Malkin, et al., "RIPng for IPv6," Jan. 1997, 19 pages, Network Working Group, Request for Comments: 2080.
RFC 2205: Braden, et al., "Resource ReSerVation Protocol (RSVP)—Version 1 Functional Specification," Sep. 1997, 112 pages, Network Working Group, Request for Comments: 2205.
RFC 2210: Wroclawski, "The Use of RSVP with IETF Integrated Services," Sep. 1997, 33 pages, Network Working Group, Request for Comments: 2210.
RFC 2211: Wroclawski, "Specification of the Controlled-Load Network Element Service," Sep. 1997, 19 pages, Network Working Group, Request for Comments: 2211.
RFC 2212: Shenker, et al., "Specification of Guaranteed Quality of Service," Sep. 1997, 20 pages, Network Working Group, Request for Comments: 2212.
RFC 2328: Moy, "OSPF Version 2," Apr. 1998, 244 pages, Network Working Group, Request for Comments: 2328, The Internet Society.
RFC 2453: Malkin, "RIP Version 2," Nov. 1998, 39 pages, Network Working Group, Request for Comments: 2453, The Internet Society.
RFC 2460: Deering, et al., "Internet Protocol, Version 6 (IPv6) Specification," Dec. 1998, 39 pages, Network Working Group, Request for Comments: 2460, The Internet Society.
RFC 2474: Nichols, et al., "Definition of the Differentiated Services Field (DS Field) in the IPv4 and IPv6 Headers," Dec. 1998, 20 pages, Network Working Group, Request for Comments: 2474, The Internet Society.
RFC 2475: Blake, et al., "An Architecture for Differentiated Services," Dec. 1998, 36 pages, Network Working Group, Request for Comments: 2475, The Internet Society.
RFC 2597: Heinanen, et al., "Assured Forwarding PHB Group," Jun. 1999, 11 pages, Network Working Group, Request for Comments: 2597, The Internet Society.
RFC 2675: Borman, et al., "IPv6 Jumbograms," Aug. 1999, 9 pages, Network Working Group, Request for Comments: 2675, The Internet Society.
RFC 2983: Black, "Differentiated Services and Tunnels," Oct. 2000, 14 pages, Network Working Group, Request for Comments: 2983, The Internet Society.
RFC 3086: Nichols, et al., "Definition of Differentiated Services Per Domain Behaviors and Rules for their Specification," Apr. 2001, 24 pages, Network Working Group, Request for Comments: 3086, The Internet Society.
RFC 3140: Black, et al., "Per Hop Behavior Identification Codes," Jun. 2001, 8 pages, Network Working Group, Request for Comments: 3140, The Internet Society.
RFC 3209: Awduche, et al., "RSVP-TE: Extensions to RSVP for LSP Tunnels," Dec. 2001, 61 Pages, Network Working Group, Request for Comments: 3209, The Internet Society.
RFC 3246: Davie, et al., "An Expedited Forwarding PHB (Per-Hop Behavior)," Mar. 2002, 16 pages, Network Working Group, Request for Comments: 3246, The Internet Society.
RFC 3247: Charny, et al., "Supplemental Information for the New Definition of the EF PHB (Expedited Forwarding Per-Hop Behavior)," Mar. 2002, 24 pages, Network Working Group, Request for Comments: 3247, The Internet Society.
RFC 3260: Grossman, "New Terminology and Clarifications for Diffserv," Apr. 2002, 10 pages, Network Working Group, Request for Comments: 3260, The Internet Society.
RFC 3289: Baker, et al., "Management Information Base for the Differentiated Services Architecture," May 2002, 116 pages, Network Working Group, Request for Comments: 3289, The Internet Society.
RFC 3290: Bernet, et al., "An Informal Management Model for Diffserv Routers," May 2002, 56 pages, Network Working Group, Request for Comments: 3290, The Internet Society.
RFC 3317: Chan, et al., "Differentiated Services Quality of Service Policy Information Base," Mar. 2003, 96 pages, Network Working Group, Request for Comments: 3317, The Internet Society.
RFC 3473: Berger, "Generalized Multi-Protocol Label Switching (GMPLS) Signaling Resource ReSerVation Protocol-Traffic Engineering (RSVP-TE) Extensions," Jan. 2003, 42 pages, Network Working Group, Request for Comments: 3473, The Internet Society.
RFC 3936: Kompella, et al., "Procedures for Modifying the Resource reSerVation Protocol (RSVP)," Oct. 2004, 7 pages, Network Working Group, Request for Comments: 3936, The Internet Society.
RFC 4113: Fenner, et al., "Management Information Base for the User Datagram Protocol (UDP)," Jun. 2005, 19 pages, Network Working Group, Request for Comments: 4113, The Internet Society.
RFC 4271: Rekhter, et al., "A Border Gateway Protocol 4 (BGP-4)," Jan. 2006, 104 pages, Network Working Group, Request for Comments: 4271, The Internet Society.

(56) References Cited

OTHER PUBLICATIONS

RFC 4301: Kent, et al., "Security Architecture for the Internet Protocol," Dec. 2005, 101 pages, Network Working Group, Request for Comments: 4301, The Internet Society.
RFC 4309: Housley, et al., "Using Advanced Encryption Standard (AES) CCM Mode with IPsec Encapsulating Security Payload (ESP)," Dec. 2005, 13 pages, Network Working Group, Request for Comments: 4309, The Internet Society.
RFC 4364: Rosen, et al., "BGP/MPLS IP Virtual Private Networks (VPNs)," Feb. 2006, 47 pages, Network Working Group, Request for Comments: 4364, The Internet Society.
RFC 4495: Polk, et al., "A Resource Reservation Protocol (RSVP) Extension for the Reduction of Bandwidth of a Reservation Flow," May 2006, 21 pages, Network Working Group, Request for Comments: 4495, The Internet Society.
RFC 4558: Ali, et al., "Node-ID Based Resource Reservation Protocol (RSVP) Hello: A Clarification Statement," Jun. 2006, 7 pages, Network Working Group, Request for Comments: 4558, The Internet Society.
RFC 4594: Babiarz, et al., "Configuration Guidelines for DiffServ Service Classes," Aug. 2006, 57 pages, Network Working Group, Request for Comments: 4594, The Internet Society.
RFC 5036: Andersson, et al., "LDP Specification," Oct. 2007, 135 pages, Network Working Group, Request for Comments: 5036, The IETF Trust.
RFC 5340: Coltun, et al., "OSPF for IPv6," Jul. 2008, 94 pages, Network Working Group, Request for Comments: 5340, The IETF Trust.
RFC 5405: Eggert, et al., "Unicast UDP Usage Guidelines for Application Designers," Nov. 2008, 27 pages, Network Working Group, Request for Comments: 5405, IETF Trust and the persons identified as the document authors.
RFC 5865: Baker, et al., "A Differentiated Services Code Point (DSCP) for Capacity-Admitted Traffic," May 2010, 14 pages, Internet Engineering Task Force (IETF), Request for Comments: 5865, IETF Trust and the persons identified as the document authors.
RFC 7431: Karan, et al., "Multicast-Only Fast Reroute," Internet Engineering Task Force (IETF), Request for Comments, Aug. 2015, 14 pages.
U.S. Appl. No. 14/543,528, Advisory Action, Mar. 11, 2016, 7 pages.
Karan A., et al., "Multicast only Fast Re-Route draft-karan-mofrr-01," Network Working Group, Mar. 13, 2011, 14 pages.
Allan et al.,"A Framework for Multi-Protocol Label Switching (MPLS) Operations and Management (OAM)," RFC 4378, 2006.
Non-Final Office Action, U.S. Appl. No. 13/486,470, dated Dec. 3, 2013, 15 pages.
Non-Final Office Action, U.S. Appl. No. 13/486,651, dated Jan. 14, 2014, 28 pages.
Notice of Allowance, U.S. Appl. No. 13/486,470, dated Apr. 17, 2014, 9 pages.
Final Office Action, U.S. Appl. No. 13/486,651, dated Jun. 4, 2014, 26 pages.
Notice of Allowance, U.S. Appl. No. 13/486,651, dated Aug. 14, 2014, 8 pages.
Non-Final Office Action, U.S. Appl. No. 14/333,327, dated Feb. 3, 2015, 9 pages.
Notice of Allowance, U.S. Appl. No. 13/486,472, dated Sep. 18, 2013, 10 pages.
Atlas, A. , et al., "An Architecture for IP/LDP Fast-Reroute Using Maximally Redundant Trees", draft-atlas-rtgwg-mrt-frr-architecture-01, Oct. 31, 2011, 26 pages, *Routing Area Working Group*.
Fei, Aiguo , et al., "A "Dual-Tree" Scheme for Fault-Tolerant Multicast", 2001, 5 pages, *IEEE*.
Fenner, B. , et al., "Protocol Independent Multicast-Sparse Mode (PIM-SM): Protocol Specification (Revised)", *IETF*, RFC4601, Aug. 2006, 112 pages.
Karan, A. , et al., "Multicast only Fast Re-Route draft-karan-mofrr-02", http://www.ieff.org/id/draft-karan-mofrr-02.txt, Mar. 9, 2012, 15 pages.
Rescorla, E., , "TLS Elliptic Curve Cipher Suites with SHA-256/384 and AES Galois Counter MOe (CGM)", *Network Working Group*, Aug. 2008, 6 pages.
Shand, M. , et al., "IP Fast Reroute Framework", *Internet Engineering Task Force (IETF)*, Jan. 2010, 15 pages.
Wijnands, IJ. , et al., "Tree Notification to Improve Multicast Fast Reroute, draft-wijnands-rtgwg-mcast-frr-tn-00", Oct. 15, 2012, 17 pages, *Routing Working Group Internet-Draft*, IETF Trust and the persons identified as the document authors.

\* cited by examiner

| | |
|---|---|
| →  | PRIMARY PATH |
| ⇒ | SECONDARY PATH |
| ←-- | REVERSED FLOW DIRECTION |

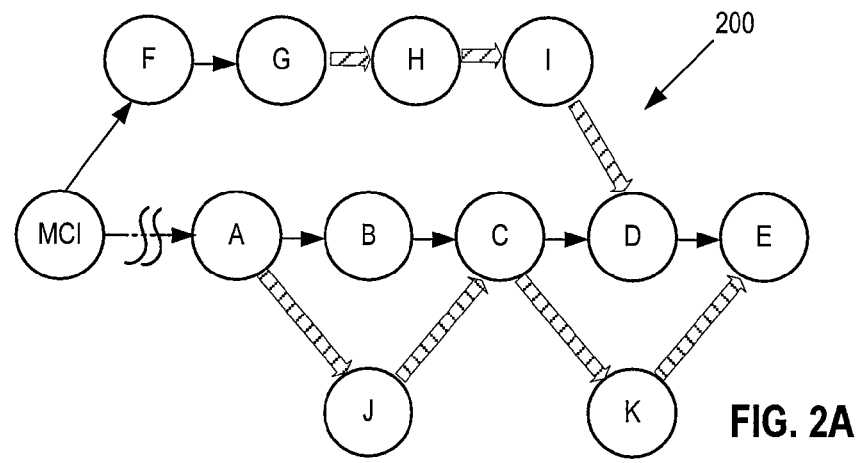
FIG. 2A
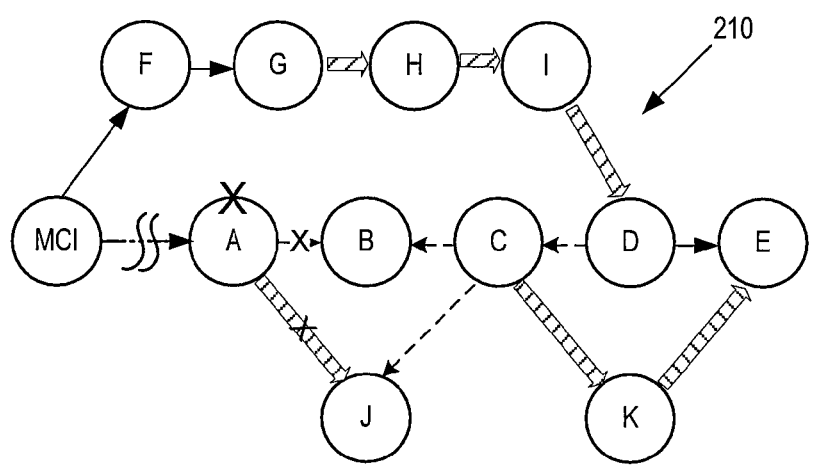
FIG. 2B
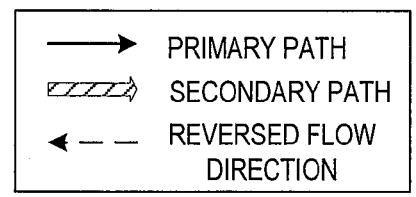

FORWARDING TABLE 302

| ORIGINAL IIFs 321 | U1, (U2) |
| --- | --- |
| ORIGINAL OIFs 322 | D1, D2 |

FORWARDING TABLE 306

| EXPANDED IIFs 361 | U1, (U2), (D1), (D2) |
| --- | --- |
| EXPANDED OIFs 362 | (U1), (U2), D1, D2 |

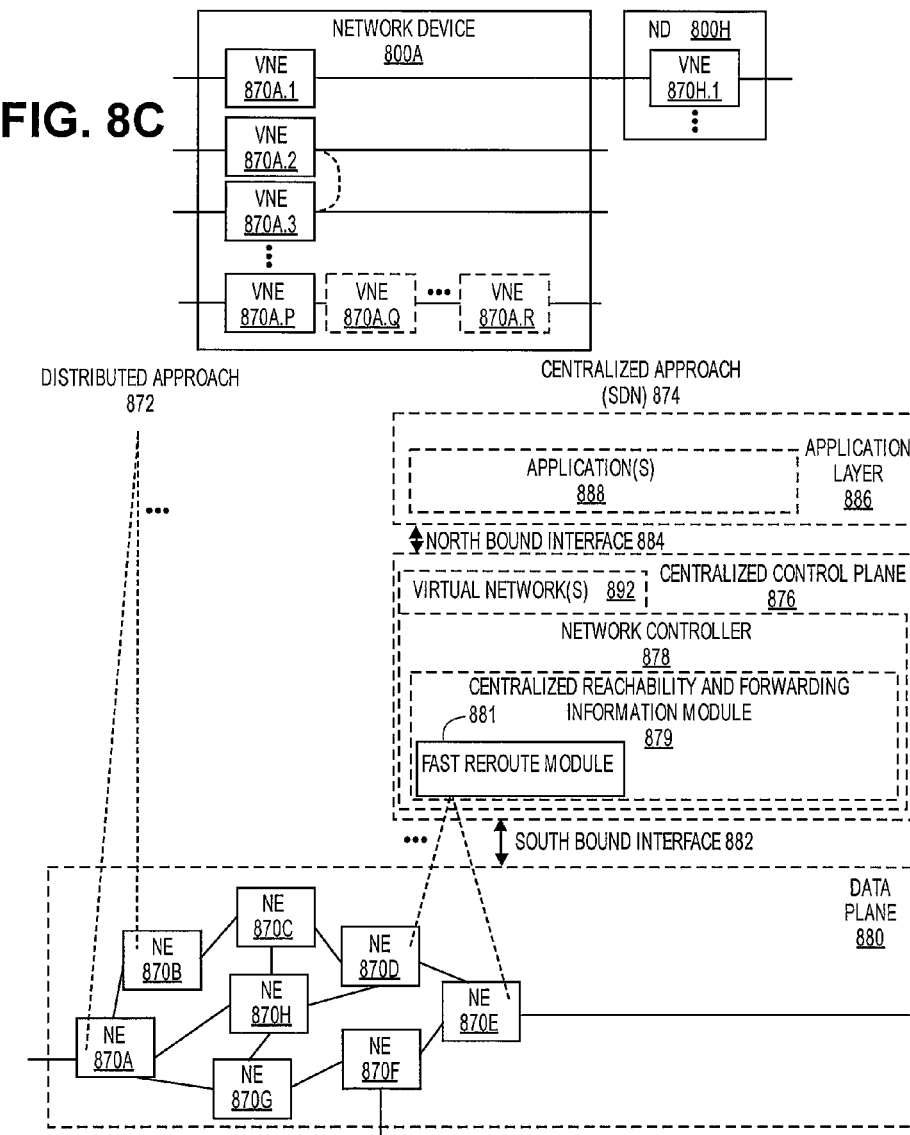
FIG. 8C
FIG. 8D
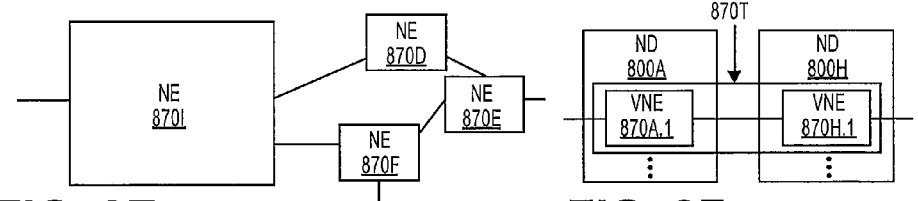
FIG. 8E
FIG. 8F

INCREASING FAILURE COVERAGE OF MOFRR WITH DATAPLANE NOTIFICATIONS

CROSS-REFERENCES TO RELATED APPLICATIONS

This application is a continuation-in-part of U.S. application Ser. No. 14/333,327, which was filed Jul. 16, 2014, which is a continuation of U.S. application Ser. No. 13/486,470, which was filed Jun. 1, 2012, which issued as U.S. Pat. No. 8,824,276 on Sep. 2, 2014, which is related to U.S. Pat. No. 8,638,659 which issued Jan. 28, 2014 and U.S. Pat. No. 8,913,482 which issued Dec. 16, 2014.

FIELD

Embodiments of the invention relate to the field of network operations; and more specifically, to routing operations in a multicast communication network.

BACKGROUND

Protocol Independent Multicast Sparse Mode (PIM-SM) (see, IETF RFC4601 of August 2006) is a well known and commonly adopted protocol for constructing and maintaining multicast trees in Internet Protocol (IP) multicast communication networks. In order to distribute multicast content to recipient nodes (hereinafter also referred to as "destinations") of the multicast communication network, PIM-SM uses a single multicast tree. A single multicast tree lacks redundancy for re-routing multicast traffic in case of a network failure.

PIM-SM is commonly used nowadays for constructing multicast paths for real-time traffic (e.g., for Internet Protocol TV (IPTV)). However, because PIM-SM strongly depends on unicast routing, in case of a network failure multicast recovery needs to wait until unicast routing has recovered. Thus, failure reaction for PIM-SM is relatively slow and is, therefore, a serious drawback for real-time applications. In order to overcome this drawback, IETF RFC5714 of January 2010 proposes an Internet Protocol (IP) fast re-route mechanism the uses a secondary path for an incoming multicast stream of a network node, thereby providing an immediate alternative path should the network node lose its connection with its primary upstream neighbor node. However, the proposed approach does not provide an efficient failure detection technique and does not handle all of the possible failure scenarios.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIGS. 2A and 2B illustrate examples of a multicast tree with redundant secondary paths provided by MoFRR.

FIG. 8C illustrates various exemplary ways in which virtual network elements (VNEs) may be coupled according to some embodiments of the invention.

FIG. 8D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 8E illustrates the simple case of where each of the NDs implements a single NE, but a centralized control plane has abstracted multiple of the NEs in different NDs into (to represent) a single NE in one of the virtual network(s), according to some embodiments of the invention.

FIG. 8F illustrates a case where multiple VNEs are implemented on different NDs and are coupled to each other, and where a centralized control plane has abstracted these multiple VNEs such that they appear as a single VNE within one of the virtual networks, according to some embodiments of the invention.

SUMMARY

Figure 1A:
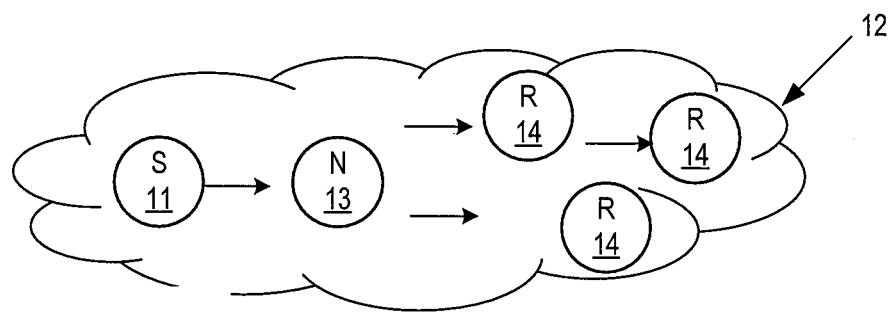
FIGS. 1A and 1B illustrate examples of multicast communication networks.

In one embodiment, a computing device functions as a network node in a multicast communication network. The multicast communication network includes a multicast tree to provide connectivity from a common source node to one or more multicast recipient nodes. The multicast communication network further includes a set of secondary paths to provide redundancy to the multicast tree. The computing device executes a plurality of virtual machines for implementing network function virtualization (NFV), wherein a virtual machine from the plurality of virtual machines is configured to implement a method for an enhanced fast re-route mechanism to provide increased failure coverage to the multicast communication network. The computing device includes a non-transitory computer-readable medium having stored therein a fast reroute module, and a processor coupled to the non-transitory computer-readable medium. The processor is configured to execute a virtual machine from the plurality of virtual machines. The virtual machine is configured to execute the fast reroute module. The fast reroute module is configured to detect a loss of connection at an incoming interface to an upstream neighbor, to determine that the network node cannot re-route the multicast data traffic to allow the multicast data traffic to reach the multicast recipient nodes, and to send a downstream fast notification packet (DFNP) from the network node downstream towards the multicast recipient nodes, wherein the DFNP causes a downstream merge node to switch reception of the multicast data traffic to a secondary path that leads to the common source node. The fast reroute module is further configured to receive an upstream fast notification packet (UFNP) from the downstream merge node by the network node, and to modify forwarding information of the network node upon receipt of the UFNP such that the multicast data traffic is to be received by the network node from a downstream neighbor of the network node via which the UFNP was received, wherein the DFNP and the UFNP cause the multicast data traffic to reverse a direction of flow between the network node and the downstream merge node to thereby re-route the multicast data traffic.

In another embodiment, a control plane device implements a control plane of a software defined networking (SDN) network including a plurality of network devices implementing the data plane of the SDN network. The control plane device is configured to execute a method for an enhanced fast re-route mechanism to provide increased failure coverage to a multicast communication network relative to a network node. The multicast communication network includes a multicast tree to provide connectivity from a common source node to one or more multicast recipient nodes. The multicast communication network further includes a set of secondary paths to provide redundancy to the multicast tree. The control plane device includes a non-transitory computer-readable medium having stored therein a fast reroute module, and a processor coupled to the non-transitory computer-readable medium. The processor is configured to execute the fast reroute module. The fast reroute module configured to detect a loss of connection at an incoming interface to an upstream neighbor, to determine that the network node cannot re-route the multicast data traffic to allow the multicast data traffic to reach the multicast recipient nodes, and to send a downstream fast notification packet (DFNP) from the network node downstream towards the multicast recipient nodes. The DFNP causes a downstream merge node to switch reception of the multicast data traffic to a secondary path that leads to the common source node. The fast reroute module is further configured to receive an upstream fast notification packet (UFNP) from the downstream merge node by the network node, and to modify forwarding information of the network node upon receipt of the UFNP such that the multicast data traffic is to be received by the network node from a downstream neighbor of the network node via which the UFNP was received. The DFNP and the UFNP cause the multicast data traffic to reverse a direction of flow between the network node and the downstream merge node to thereby re-route multicast data traffic.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention increase the failure coverage of MoFRR by allowing multicast traffic to reverse its direction between a failure-detecting node and a merge node.

Before describing the embodiments of the invention, it is helpful to understand how a network node joins a multicast group according to PIM-SM. In PIM-SM, a network node uses unicast forwarding messages for joining or leaving a multicast group. In order to join a multicast group, the network node sends a JOIN message in upstream direction of the multicast tree to a common source node (the term "common source node" hereinafter refers to a multicast source node or a rendezvous point in the case of a shared tree). The JOIN message is routed along a path of the multicast tree determined by Multicast Routing Information Base (MRIB) tables. The paths listed in these tables are usually derived directly from unicast routing tables, but they could also be derived differently. Similarly, a network node wanting to leave a multicast group sends a PRUNE packet up the multicast tree to the common source network node.

The MRIB tables are used to determine next-hop neighbors to which the JOIN message is sent next. The JOIN message is routed and processed on a hop-by-hop basis until a network node already receiving the multicast content is reached. All network nodes along this hop-by-hop path process the JOIN message and install or update corresponding multicast routing state information; e.g., by adding the incoming interface via which the JOIN message was received to an outgoing interface list of the multicast. For example, if a node X receives a JOIN message via an incoming interface to node Y, node X will add node Y to the list of outgoing interfaces for the multicast. Multicast content are routed to network nodes in a direction reversed to the direction in which the JOIN messages were received.

Multicast only Fast Re-Route (MoFRR) is an IP fast re-route mechanism, where a network node joins a multicast group via more than one path. Joining a multicast group involves transmitting a JOIN message from the node towards a source on a primary path and another JOIN message from the node towards the source on a secondary path. Should a dual joining node loses its connection on the primary path, the node has an instantly available secondary path to which it can switch.

According to MoFRR, each dual joining node has a primary upstream multicast hop (UMH) on the primary path and a secondary UMH on the secondary path. Each UMH is the node's previous-hop neighbor upstream from the node on the path toward a MultiCast Ingress node (MCI). An MCI is the node from which the multicast stream enters the current transport technology (e.g., PIM) domain, and, therefore, the MCI can be regarded as the multicast source for the current domain. In the description herein, the term "MCI" is used synonymously with a multicast source node. It is understood that embodiments of the invention are applicable to scenarios where an MCI is different from a multicast source node in a general sense; e.g., when the MCI receives multicast data from the multicast source node that is located in a different transport technology domain.

According to MoFRR, a dual joining node's (J) secondary UMH can be chosen from a list of candidate nodes (i.e., previous-hop upstream nodes), which come from either node J's Equal Cost Multipath (ECMP) or Loop Free Alternate (LFA) neighbors on the paths towards the MCI. A node N is node J's ECMP neighbor if the node can be reached from node J with the same cost as the cost for node J to reach the primary UMH. A node N is node J's LFA neighbor if one of the LFA criteria specified in RFC 5289 (September 2008) or the non-ECMP mode conditions for MoFRR described in draft-karan-mofrr-02 (March 2012) is satisfied.

MoFRR implements a live-live multicast protection technique, where a dual joining node receives the same multicast stream from both the primary and secondary paths. To prevent duplicate packets being forwarding to the end user, a dual-joining node only accepts packets from one of the UMHs at a time in a network operating in the live-live protection mode. Which UMH is preferred is a local decision that can be based on Interior Gateway Protocol (IGP) reachability, link status, Bidirectional Forwarding Detection (BFD), traffic flow, etc. When no failure is detected in the network, receipt of duplicated packets can be prevented by blocking the incoming interface to the less-preferred UMH; i.e., packets received from this incoming interface are not forwarded on the multicast tree. If, however, the preferred UMH fails, the incoming interface to the less-preferred UMH can be unblocked to allow the traffic to continue downstream.

In the description herein, the term "upstream" refers to the direction along the paths toward the MCI, and the term "downstream" refers to the direction along the paths away from the MCI. Further, a "neighboring node" is a node one hop away from a current node. A "previous hop" is an upstream neighboring node of a current node, and a "next hop" is a downstream neighboring node of a current node. A "branch node" is a node coupled to more than one path going downstream; a "merge node" is a node coupled to more than one path coming from upstream.

Moreover, the terms "link," "interface" or "neighbor" can mean "physical" or "virtual" link, interface or neighbor. A "physical" link means a direction connection between two nodes. A physical interface or neighbor means an interface/node coupling to another interface/node via a physical link. A "virtual" link can be a lower-layer tunnel or a complex network between two nodes. A virtual interface/node means an interface/node coupling to another interface/node via a virtual link. For example, two IP routers connected via a complex Ethernet network are "virtual neighbors" at the IP level.

An enhanced MoFRR is described herein which provides fast re-route based on PIM-SM with increased failure coverage. The speed of failure reaction is improved by using a downstream fast notification packet (DFNP) that is generated and processed in the dataplane of a network node when the network node detects a failure. The use of DFNP improves the speed and reliability for reacting to non-local failures (i.e., remote failures, or equivalently, failures that have occurred at a node or link more than one hop away). The failure coverage is increased by providing failure coverage to the nodes that do not have a secondary UMH. The enhanced MoFRR will be described in detail below.

FIG. 1A illustrates a multicast communication network 12 that includes multiple network nodes ("nodes"). The multicast communication network 12 is an operator's network. A common source node (e.g., node S 11) sends multicast data to the members of its multicast group via a multicast tree topology. The common source node may be the MCI or a branch node of a multicast group. Multicast recipient nodes (e.g., node R 14), which are also referred to as MultiCast Egress node (MCE), are the nodes that are coupled to subscribers of the multicast, or domain egress nodes that are coupled to neighboring domains where there are subscribers of the multicast. The leaf nodes of the multicast tree are typically MCEs. Between the common source node and the leaf nodes of the multicast tree are a number of interior nodes (e.g., node N 13). Multicast data flows downstream from the common source node to the leaf nodes via the interior nodes. In one embodiment, one or more of the interior nodes may also be MCEs.

Figure 1B:
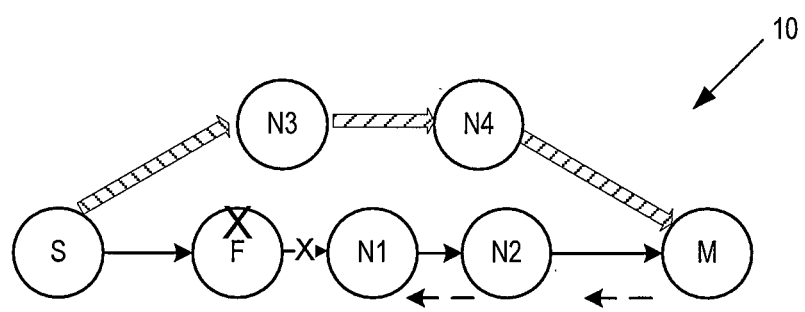

FIG. 1B is an example of a segment of a multicast communication network 100 that illustrates a problem of insufficient failure coverage provided by MoFRR. Assume that node S is a common source node and node M is a merge node in the network segment. From node S to Node M there are two alternative paths: one is a primary path S→F→N1→N2→M and the other is the secondary path S→F→N3→N4→M. Nodes N1 and N2 may have subscribers as well as node M. According to MoFRR, node M can switch multicast reception to the secondary path if node F fails. However, nodes N1 and N2 will be unable to receive the multicast in case of the failure, because they are not connected to a secondary path.

As explained above, a MoFRR network does not provide full failure coverage as some of the nodes in the network may not be connected to a secondary path. Embodiments of the invention increase the failure coverage of MoFRR by providing a redundant path using the nodes downstream from the failure on the primary path. In the example of FIG. 1B, a redundant path (indicated by the dotted lines) for nodes N1 and N2 can be provided by reversing the multicast data traffic between node N1 (which is the next hop from failure) and node M (which is the node having a working secondary path). Node M will receive multicast from the secondary path via nodes N3 and N4. As a result, all the nodes M, N1 and N2 can continue to receive multicast as before the failure of node F.

FIG. 2A illustrates an example of a multicast communication network 200 that supports MoFRR. The thin lines connecting MCI→A→B→C→D→E and MCI→F→G form a multicast tree defined by PIM-SM. The thick lines connecting A→J→C, C→K→E and G→H→I→D represent secondary backup paths added by MoFRR for nodes C, E and D, respectively. Thus, nodes C, D and E are dual-joining nodes. Node C's primary path from the MCI is MCI→A→B→C and its secondary path is MCI→A→J→C. Thus, node C's primary UMH is node B and secondary UMH is node J. Node B has node A as its primary UMH but does not have a secondary UMH.

FIG. 2B illustrates an example of a multicast communication network 210, which has the same configuration as network 200 but with a failed node A. According to the rules of MoFRR, each of nodes B, C, J and K does not have a working secondary path that can protect against the failure of node A. An embodiment of the enhanced MoFRR re-establishes the multicast stream in a fast pre-calculated manner to nodes not having a working secondary path. In the above example with the failure of A, node D can switch to a secondary UMH (i.e., node I). Node C can switch to node D, and nodes B and J can switch to node C. Node K will receive a DFNP from node C, and will forward it to node E (as node K has no secondary path). Node E, however, will only receive a DFNP from node K, because node D (which has a working secondary UMH) does not forward a DFNP to node E. Therefore, node E will receive a DFNP only from its secondary UMH, and will not react to it. As a result, the multicast data traffic flow is reversed between node B and node D, and between node J and node D, where nodes B and J are the next hops from failure, and node D is the node having a working secondary path.

Before describing the enhanced MoFRR that reverses the traffic flow in case of failure as in the example of FIG. 2B, a failure detection technique is explained first. The failure detection uses a downstream fast notification packet (DFNP) to notify the nodes downstream from a failure of the occurrence of the failure and that upstream nodes cannot repair the failure.

In one embodiment, when a node detects a local failure (which may be caused by a failure of its UMH or a link connecting to the UMH), the node originates a DFNP to all the downstream branches connecting to downstream nodes in the multicast group. In one embodiment, the downstream branches include all of the links on the primary paths and the secondary paths in the multicast group. The DFNP originating node is a failure-detecting node that has no failure-free secondary path to which it can fall back. If the failure-detecting node has an available secondary path available, it can use the secondary path to receive multicast data and no DFNP is generated. When a DFNP is generated, the downstream node that has an available secondary path can be triggered by the DFNP to make a switch-over to the secondary path.

The DFNPs can be generated in the dataplane, using only the forwarding information available in the dataplane without inputs from the control plane. The DFNPs can also be processed in the dataplane when they are received. All of the information necessary for sending and receiving a DFNP is available in the dataplane prior to the occurrence of a network failure. The dataplane-only approach significantly reduces the reaction time when a failure occurs. In one embodiment, the origination and processing of DFNPs can be performed within one or more line cards in the dataplane; updates to the control plane (e.g., the routing tables) can be performed moments later without impacting the failure recovery in real time.

If a failure occurs in a non-local upstream location, a dual-joining node needs a fast and reliable mechanism to detect the upstream failure. For embodiments based on MoFRR, a dual joining node also needs to learn that other upstream nodes cannot circumvent the failure. Other methods based on traffic monitoring are limited in scope and work best with a steady state packet flow. For example, if there is constant heavy multicast traffic in the network, an interruption in the traffic flow can serve as an indicator of failure. By contrast, DFNPs are independently of the state of packet flows. A DFNP is an indicator of a non-local failure and can trigger the unblocking of a secondary backup path.

In the following, a description is provided regarding the rules (R1-R4) followed by each node downstream from the DFNP-originating node. In one embodiment, the rules may be stored in the dataplane circuitry of each node, such as the network node to be described below in FIGS. 7A and 7B.

(R1) If a node receives a DFNP from its primary UMH and has a failure-free secondary path (e.g., receiving no DFNP from its secondary UMH or detecting no failure at the connection to the secondary UMH), the node is a repair node. Upon receiving a DFNP, this repair node is to unblock the secondary path to its secondary UMH. The repair node does not forward the DFNP further downstream.

(R2) If a node receives a DFNP from its primary UMH but does not have a secondary UMH, the node is not a repair node. Upon receiving a DFNP, this node is to forward the DFNP to all of its downstream nodes. For embodiments based on MoFRR, the downstream nodes include all the nodes that are on the branches of the primary and secondary paths further downstream.

(R3) If a node receives two DFNPs—one from its primary UMH and the other from its secondary UMH, this node is also not a repair node. Receiving two DFNPs from respective UMHs is an indication that both of its primary path and secondary path are faulty. Upon receiving the two DFNPs, the node is to forward one of the DFNPs to all of the downstream nodes (as in R2). The other DFNP can be discarded (equivalent to "not forwarded"). In a scenario, the node upon receiving the DFNP from its primary path can wait for a predetermined amount of time to see if it will receive another DFNP from its secondary path. If another DFNP is received from the secondary path, the node does not need to unblock the secondary path because the unblocking cannot remedy the failure. In another scenario, the node upon receiving the DFNP from its primary path can unblock its secondary path immediately and discard the received DFNP. If the node subsequently receives no multicast data traffic but instead receives another DFNP from the secondary UMH, the node will forward this other DFNP to all of its downstream nodes.

(R4) A DFNP received only from the secondary UMH of a node is to be discarded.

The decision on whether to forward a DFNP can be summarized as follows. A node does not forward a DFNP further downstream if it receives the DFNP from its secondary path only, or if it receives the DFNP from its primary path and its secondary path is potentially working (e.g., the "down status" of the secondary UMH is not yet confirmed by local detection or by a DFNP received from the secondary UMH). A node forwards a DFNP further downstream if the node receives the DFNP from its primary path and no secondary path exists for the node, or if the node receives the DFNP from one of its primary path and secondary path and previously another DFNP was received from the other of its primary path and secondary path.

The example of FIG. 2A can be used to illustrate an application of the above rules. If node A fails, nodes B and J will both detect the failure locally (e.g., at their respective incoming interfaces) and each originates a DFNP. Both DFNPs are sent downstream towards node C. Node C is not a repair node because it will receive two DFNPs from its primary UMH (node B) and its secondary UMH (node J). Because node C is not a repair node it will forward one of the DFNPs towards K and D (observing rule R3). Node K does not have a secondary UMH for the multicast tree, so it will send the DFNP downstream towards node E (observing rule R2). Node D has a working secondary UMH (node I), so node D is the repair node (applying rule R1). Node E applies rule R4. As a result, subscribers sitting at or downstream from nodes D and E will continue receiving the multicast traffic.

A DFNP allows a node downstream from a failure to unambiguously identify the multicast tree impacted by the failure. In one embodiment, a DFNP includes a multicast source address and a multicast group address (e.g., in the IP source/destination address fields) identifying the multicast group or multicast tree.

A DFNP is easy to recognize by recipient nodes. In one embodiment, either a special IP protocol value (e.g., in the IP header) or a specially allocated User Datagram Protocol (UDP) port number can be used for distinguishing DFNPs from regular data packets in the multicast stream. If a special UDP port number is used, the IP protocol field may be set to an easily recognizable value, such as "103" corresponding to PIM. In some embodiments for troubleshooting purposes, the payload may contain the ID of the node originating the DFNP, and may also contain the ID of the node to which connectivity was lost and/or the link ID on which the connectivity was lost. In some embodiments, a DFNP may also include a timestamp indicating the time of its origination.

To enable the reversion of multicast flow as described in FIGS. 1B and 2B, each of the network nodes is configured to perform operations in three phases: a preparation phase, a first failure reaction phase and a second failure reaction phase. In the preparation phase, each network node prepares its incoming interfaces (IIFs) and outgoing interfaces (OIFs) such that it can have a fast reaction to failures. In one embodiment, the IIFs and OIFs are installed in the Forwarding Information Database (FIB) or forwarding tables in the dataplane cards (i.e., line cards) of a network node.

In the first failure reaction phase, a DFNP is sent downstream from the node detecting the failure of its UMH. When a node receives the DFNP, it unblocks its OIFs in the upstream direction. In the second failure reaction phase, the node which has a working secondary UMH (i.e., the repair node as defined by rules R1-R4 above) sends an upstream fast notification packet (UFNP) on its primary path towards the MCI along all of the branches upstream. When a node receives the UFNP, it unblocks its incoming interfaces to the downstream nodes.

Figures 3A, 3B, 3C:
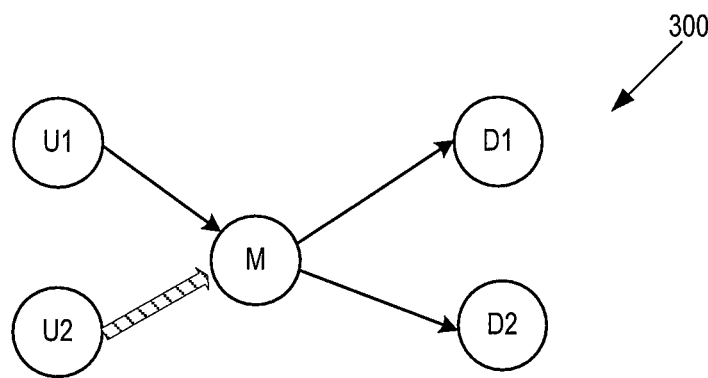
FIG. 3A illustrates a simplified network segment in a multicast communication network.
FIG. 3B illustrate an example of a forwarding table according to MoFRR.
FIG. 3C illustrate examples of a forwarding table according to enhanced MoFRR in one embodiment.

The operations of the three phases are explained in further detail below. FIGS. 3A-3C illustrate an example of the preparation phase performed by a node M in a network segment 300 of FIG. 3A. Node M has a primary UMH U1 and a secondary UMH U2. Node M also has two downstream nodes D1 and D2. According to MoFRR as shown in FIG. 3B, node M stores a forwarding table 302 that contains a list of original IIFs 321: U1 and (U2), and a list of original OIFs 322: D1 and D2, where a pair of parentheses around an interface indicates that interface is blocked. According to an embodiment of the enhanced MoFRR with increase failure coverage as shown in FIG. 3C, node M stores a forwarding table 306 that contains a list of expanded IIFs 361: U1, (U2), (D1) and (D2), and a list of expanded OIFs 362: (U1), (U2), D1 and D2.

Referring to Node C of FIG. 2A, node C installs an IIF leading to node B and two OIFs leading to nodes D and K according to PIM (shown in Table 2). According to MoFRR, node C also installs an additional IIF leading to node J in blocked state, as node J is a secondary UMH towards MCI for node C. Node C receives the same traffic from nodes B and J, but traffic from node J is discarded.

According to one embodiment of the enhanced MoFRR, node C installs its interface towards B as a blocked OIF as well as an IIF. Node C also installs its interfaces to nodes D and K as blocked IIFs as well as OIFs. Tables 1-3 provide an example showing how the interfaces can be installed for a multicast tree from the MCI. Interfaces in parentheses are blocked.

TABLE 1

Interfaces of Node B before failure

| Node B | PIM | MoFRR | Enhanced MoFRR |
|---|---|---|---|
| Incoming interfaces | A | — | A, (C) |
| Outgoing interfaces | C | — | (A), C |

TABLE 2

Interfaces of Node C before failure

| Node C | PIM | MoFRR | Enhanced MoFRR |
|---|---|---|---|
| Incoming interfaces | B | (J) | B, (J), (D), (K) |
| Outgoing interfaces | D, K | — | (B), (J), D, K |

TABLE 3

Interfaces of Node D before failure

| Node D | PIM | MoFRR | Enhanced MoFRR |
|---|---|---|---|
| Incoming interfaces | C | (I) | C, (I), (E) |
| Outgoing interfaces | E | — | (C), (I), E |

Figure 4:
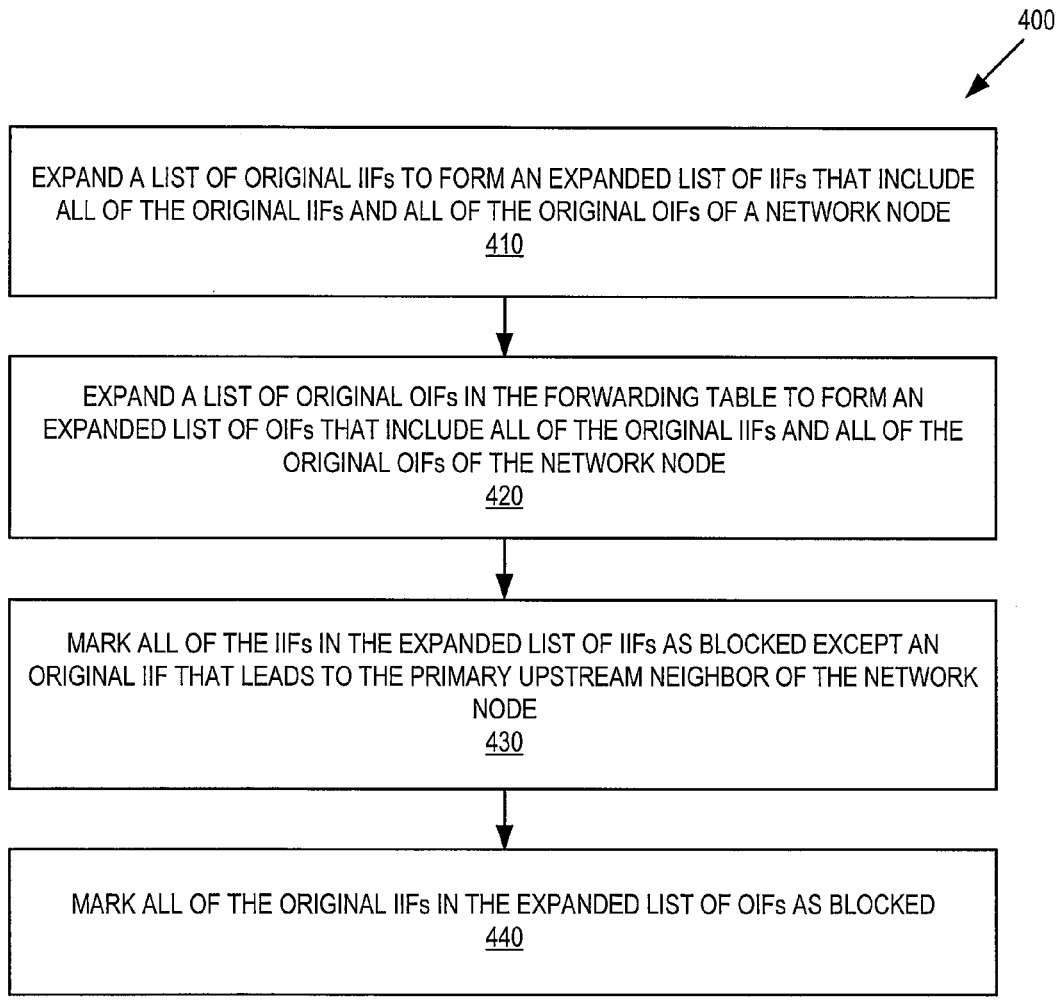
FIG. 4 is a flow diagram illustrating a method for setting up the interfaces during a preparation phase according to one embodiment.

FIG. 4 is a flow diagram illustrating a method 400 for installing the interfaces in each node of a multicast communication network. The method 400 begins with each network node expanding a list of original IIFs to form an expanded list of IIFs that include all of the original IIFs and all of the original OIFs of a network node (block 410). The "original IIFs" and "original OIFs" represent the interfaces that are installed according to MoFRR. Each network node then expands a list of original OIFs in the forwarding table to form an expanded list of OIFs that include all of the original IIFs and all of the original OIFs of the network node (block 420). Subsequently, each network node marks all of the IIFs in the expanded list of IIFs as blocked, except an original IIF that leads to its primary UMH (block 430). Each network node also marks all of the original IIFs in the expanded list of OIFs as blocked (block 440).

As all of the extra interfaces of the enhanced MoFRR are installed in blocked state, multicast data traffic flows identically to the multicast tree established with PIM when there is no failure in the network. When a failure occurs in the network, the operations of the network enter the first failure reaction phase, during which backup paths are activated in the multicast tree.

When a node detects a failure to its UMH, it originates a DFNP as described above if it does not have a working secondary path to fall back to. A downstream node receiving the DFNP processes the DFNP according to rules R1-R4 described above with the additional operations as follows.

When a downstream node receives a DFNP from an UMH, it is an indication that none of its upstream nodes can repair the failure. Thus, the downstream node finds the UMH interface in its expanded OIF list and unblocks that interface.

If this downstream node has a failure-free secondary path (i.e., it does not receive a DFNP from the secondary UMH or otherwise detects no failure from the secondary UMH), the downstream node unblocks its secondary UMH and blocks its primary UMH in the expanded IIF list. Unblocking the secondary UMH allows the downstream node to receive the multicast data traffic. In one embodiment, this downstream node is a merge node.

When the DFNP reaches this merge node, the operations of the network enter the second failure reaction phase, during which the multicast tree is modified such that data traffic received from this working secondary UMH is sent to the direction from which the DFNP was received.

During the second failure reaction phase, the merge node sends an upstream fast notification packet (UFNP), which is a notification generated and processed in the dataplane. The UFNP is sent towards the MCI along all of the paths in the upstream direction, including the primary paths and the secondary paths. Similar to a DNFP, a UFNP unambiguously identifies the multicast tree impacted by the failure. In one embodiment, a UFNP includes a multicast source address and a multicast group address (e.g., in the IP source/destination address fields) identifying the multicast group or multicast tree. A UFNP is easily recognizable by including a special IP protocol value (e.g., in the IP header) or a specially allocated User Datagram Protocol (UDP) port number, such as "103" corresponding to PIM. In some embodiments for troubleshooting purposes, the payload may contain the ID of the node originating the UFNP, and may also contain the ID of the node to which connectivity was lost and/or the link ID on which the connectivity was lost. In some embodiments, a UFNP may also include a timestamp indicating the time of its origination.

Any node that receives the UFNP unblocks the interface from which the UFNP was received in its expanded IIF list, and blocks the same interface in the expanded OIF list. Note that the UFNP may be received from multiple downstream legs but only the interface for the first UFNP received for that multicast group is unblocked in the expanded IIF list. Other UFNPs are discarded. A UFNP is sent upstream up to the point where the DFNP was originated.

Referring to the example FIG. 2B when a failure occurs to node A, a first DFNP is originated by node B and sent downstream to node C; a second DFNP is originated by node J and sent downstream to node C.

When node C receives the DFNPs, it unblocks the interface leading to node B in the expanded OIF list and sends one of the DFNPs further downwards to nodes D and K. The other DFNP is not forwarded. When node D receives the DFNP, it unblocks the interface leading to node C in its expanded OIF list. Node D has a working secondary UMH, so it unblocks its incoming interface to the secondary UMH, generates a UFNP and sends the UFNP upstream to node C.

When node C receives the UFNP, it unblocks the interface leading to node D in the expanded IIF list, blocks the same interface in its expanded OIF list, and forwards the UFNP upstream to node B. When node B receives the UFNP, it unblocks the interface leading to node C in its expanded IIF list, blocks the same interface in its expanded OIF list, and discards the UFNP as node B originated the DFNP.

The resulting modified multicast forwarding entries for nodes B, C and D are shown below in Tables 4-6. Interfaces in parentheses are blocked.

TABLE 4

Node B before and after failure according to enhanced MoFRR

| Node B | Before failure | After failure |
|---|---|---|
| Incoming interfaces | A, (C) | (A), C |
| Outgoing interfaces | (A), C | (A), (C) |

TABLE 5

Node C before and after failure according to enhanced MoFRR

| Node C | Before failure | After failure |
|---|---|---|
| Incoming interfaces | B, (J), (D), (K) | (B), (J), D, (K) |
| Outgoing interfaces | (B), (J), D, K | B, J, (D), K |

TABLE 6

Node D before and after failure according to enhanced MoFRR

| Node D | Before failure | After failure |
|---|---|---|
| Incoming interfaces | C, (I), (E) | (C), I, (E) |
| Outgoing interfaces | (C), (I), E | C, (I), (E) |

As can be seen from the above example, with enhanced MoFRR nodes B, C, J and K can receive the multicast data stream, which is not possible with conventional MoFRR. If nodes B, C, J and K have further nodes downstream below them (not shown in FIG. 2B), these downstream nodes can also continue receiving the multicast data traffic according to embodiments of the invention.

Figure 5:
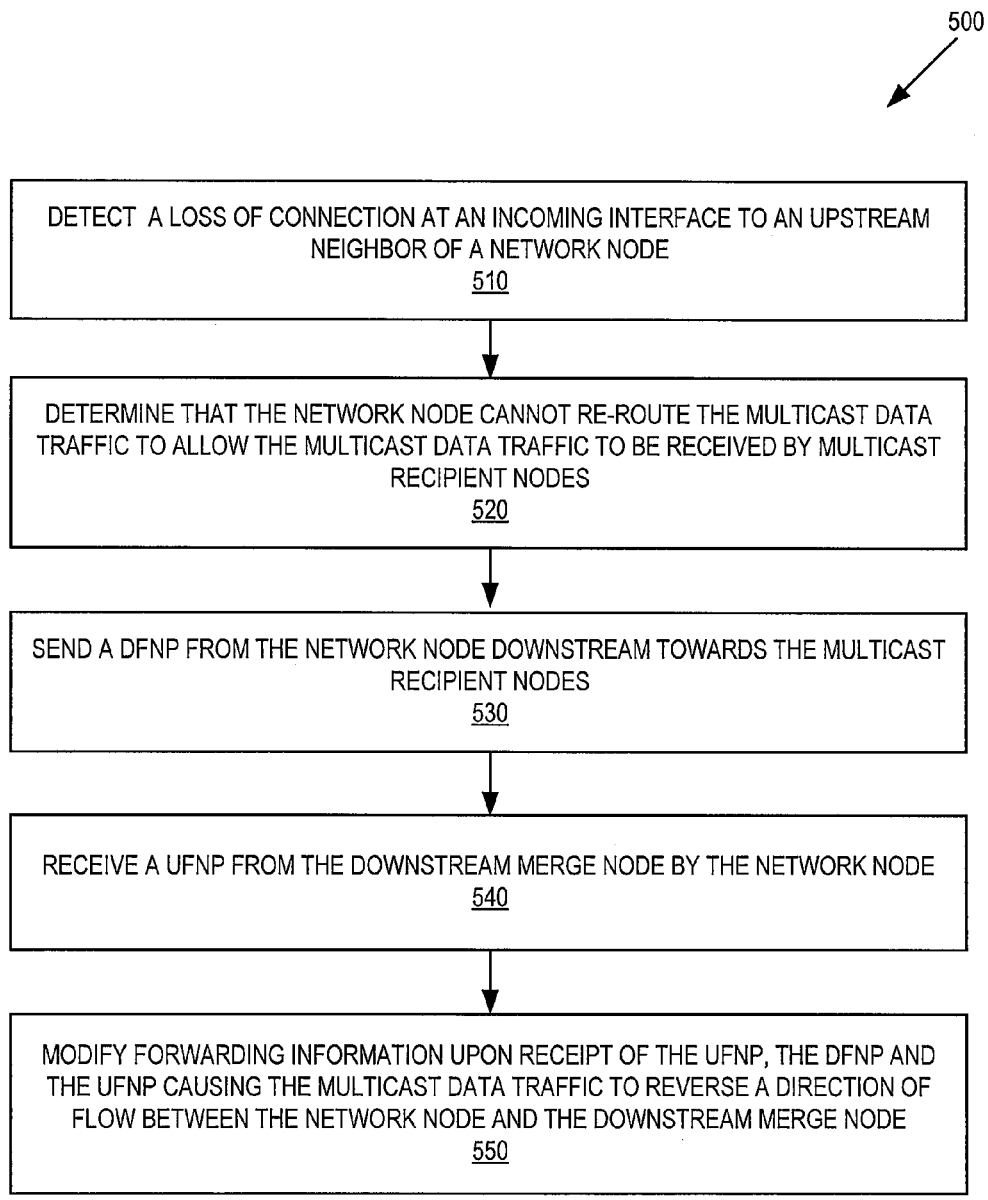
FIG. 5 is a flow diagram illustrating a method for operating a failure-detecting node according to one embodiment.

FIG. 5 is a flow diagram illustrating a method 500 for operating a network node in a multicast communication network according to one embodiment of the invention. The network node in this embodiment is the failure-detecting node. The method 500 begins with a network node detecting a loss of connection at its incoming interface to a UMH (block 510). The network node determines whether it can re-route the multicast data traffic to allow the multicast data traffic to be received by the multicast recipient nodes. If it is determined that the network node cannot perform the re-routing (block 520), the network node sends a DFNP downstream towards multicast recipient nodes (block 530). The DFNP causes a downstream merge node to switch reception of the multicast data packet to its secondary path leading to the common source node, and to forward the multicast data traffic to its upstream neighbor via which the DFNP was received. Subsequently, the network node receives a UFNP from the merge node (block 540). Upon receiving the UFNP, the network node modifies its forwarding information (block 550), such that the multicast data traffic can be received by the network node from its downstream neighbor via which the UFNP was received. The DFNP and the UFNP cause the multicast data traffic to reverse the direction of flow between the network node and the downstream merge node to thereby re-route the multicast data traffic.

Figure 6:
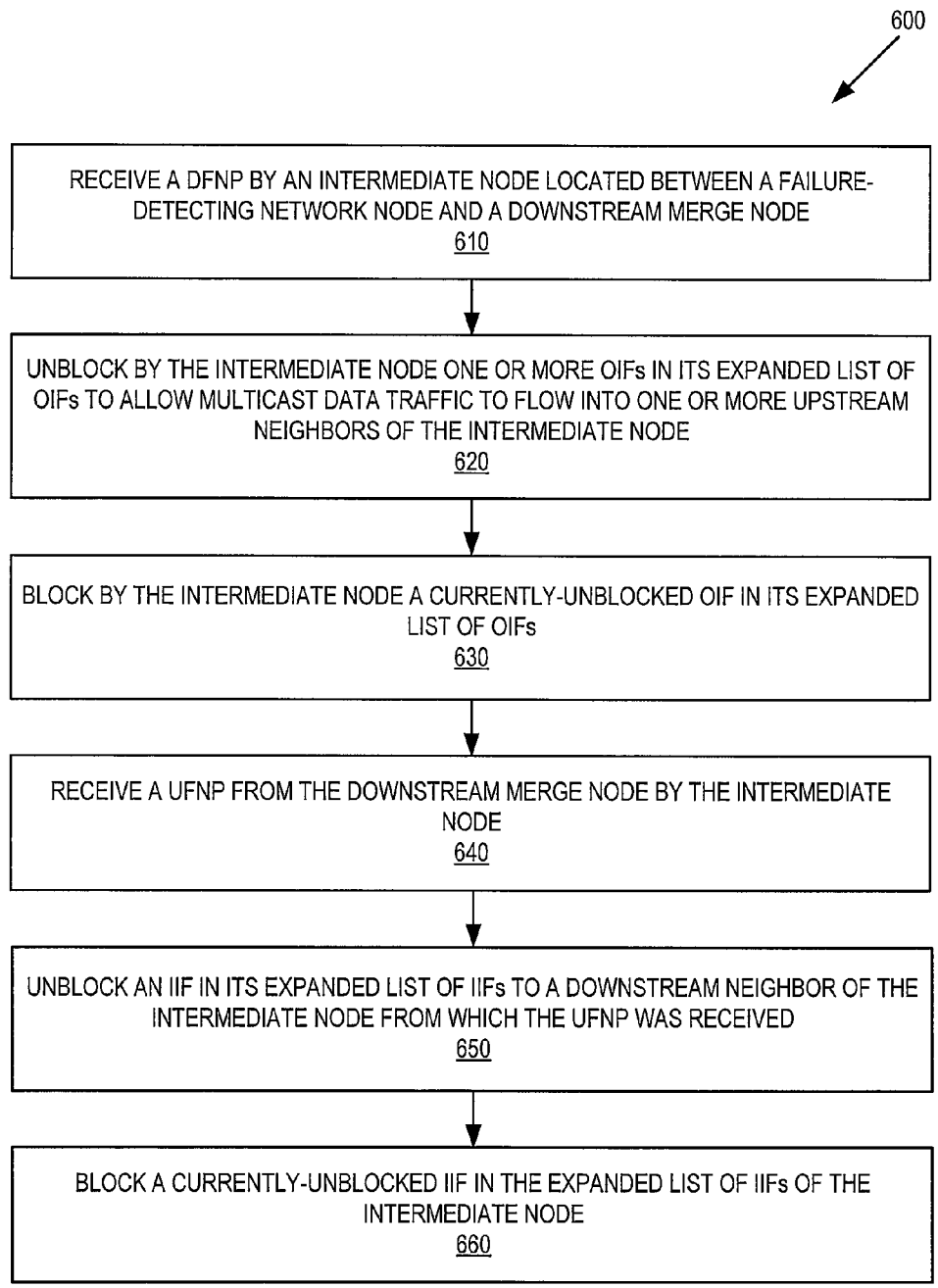
FIG. 6 is a flow diagram illustrating a method for operating an intermediate node between a failure-detecting node and a merge node according to one embodiment.

FIG. 6 is a flow diagram illustrating a method 600 for operating a network node in a multicast communication network according to one embodiment of the invention. The network node in this embodiment is an intermediate node between the failure-detecting node and the merge node. The method 600 begins with an intermediate node receiving a DFNP (block 610). The intermediate node unblocks one or more OIFs in its expanded OIF list to allow the multicast data traffic to flow into one or more upstream neighbors of the intermediate node (block 620). The intermediate node also blocks a currently-unblocked OIF in its expanded OIF list (block 630). When the intermediate node receives a UFNP (block 640), it unblocks an IIF in its expanded IIF list that leads to a downstream neighbor from which the UFNP was received (block 650). The intermediate node also blocks a currently-unblocked IIF in its expanded IIF list (block 660).

Figure 7A:
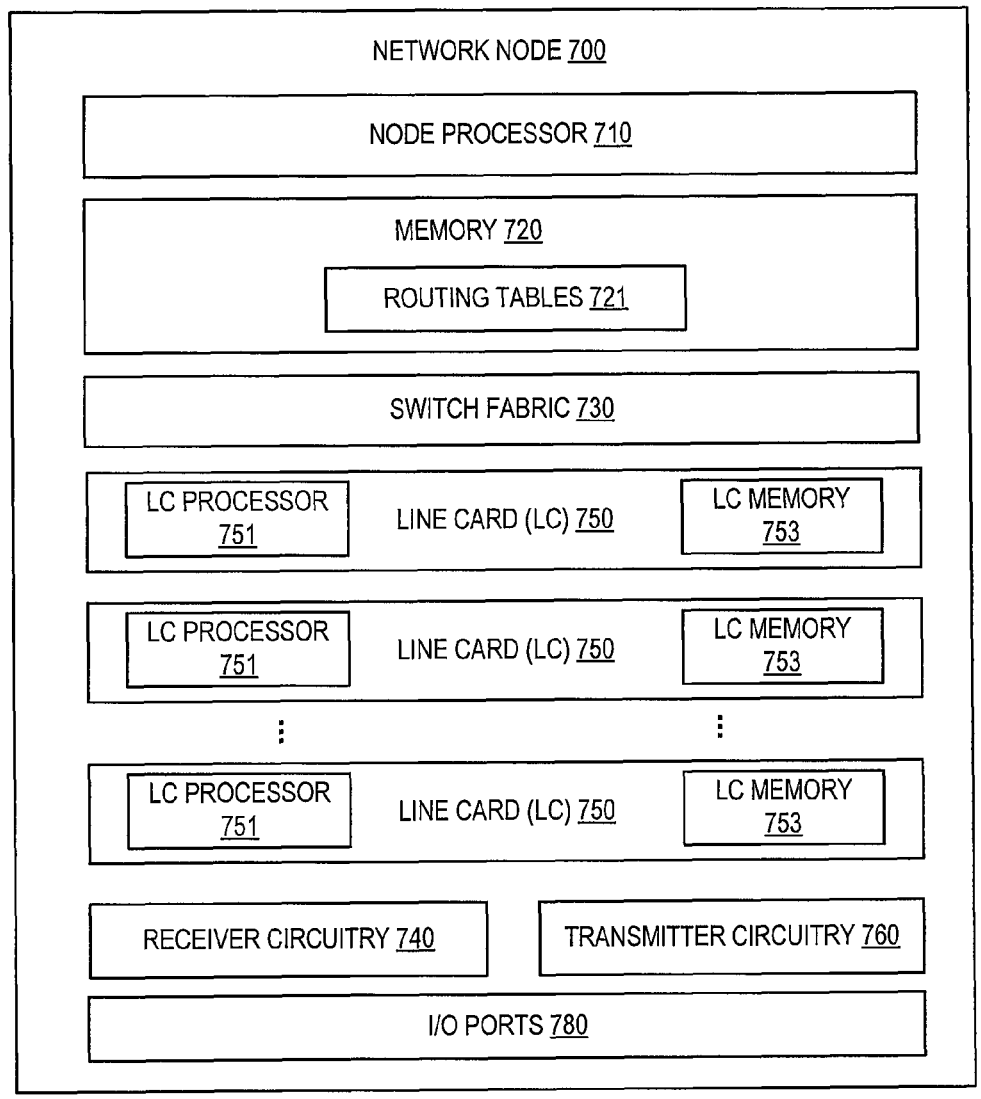
FIGS. 7A and 7B are diagrams of a network node according to one embodiment of the invention.
Figure 7B:
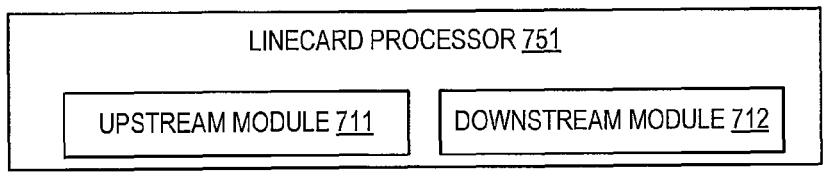

FIG. 7A illustrates an example of a network node 700 that may be used to implement an embodiment of the invention. As shown in FIG. 7A, the network node 700 includes a dataplane, which further includes a switching fabric 730, a number of line cards 750 and multiple I/O ports 780. Each line card 750 includes a line card processor 751 to perform functions on the data received over the I/O ports 780. As shown in FIG. 7B, an embodiment of the line card processor 751 includes an upstream module 711 and a downstream module 712. The upstream module 711 is configured to modify the forwarding information upon receipt of a UFNP such that the multicast data traffic can be received by the network node from a downstream neighbor via which the UFNP was received. The downstream module 712 is configured to originate a DFNP in response to a determination that the network node cannot re-route the multicast data traffic. The dataplane also includes line card memory 753 that stores forwarding tables for each multicast group to which the network node 700 is a member. The forwarding tables store forwarding information for tracking the network node's upstream neighbors (e.g., the UMHs), downstream neighbors, the IIFs and the OIFs to these neighbors. The switching fabric 730 switches data between the line cards 750.

The dataplane also includes receiver circuitry 740 and transmitter circuitry 760. The receiver circuitry 740 and the transmitter circuitry 760 are configured to receive and send, respectively, multicast data and control packets including the UFNPs and DFNPs described above.

The network node 700 also includes a control plane. The control plane further includes one or more node processors 710 containing control logic configured to handle the routing and management of the network traffic. The control plane also includes a memory 720, which stores one or more routing tables 721, among other things, to maintain the routing information of the network. It is understood that the network node 700 may include additional components and information than what is described above.

The operations of the diagrams of FIGS. 4-6 have been described with reference to the exemplary embodiment of FIGS. 7A and 7B. However, it should be understood that the operations of the diagrams of FIGS. 4-6 can be performed by embodiments of the invention other than those discussed with reference to 7A and 7B, and the embodiment discussed with reference to 7A and 7B can perform operations different than those discussed with reference to the diagrams of FIGS. 4-6. For example, the operations can be performed in relations to the embodiments described herein below with regard to FIGS. 8A-9. While the diagrams of FIGS. 4-6 show a particular order of operations performed by certain embodiments of the invention, it should be understood that such order is exemplary (e.g., alternative embodiments may perform the operations in a different order, combine certain operations, overlap certain operations, etc.).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

As used herein, a network element (e.g., a router, switch, bridge, controller) is a piece of networking equipment, including hardware and software, that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figures 8A, 8B:
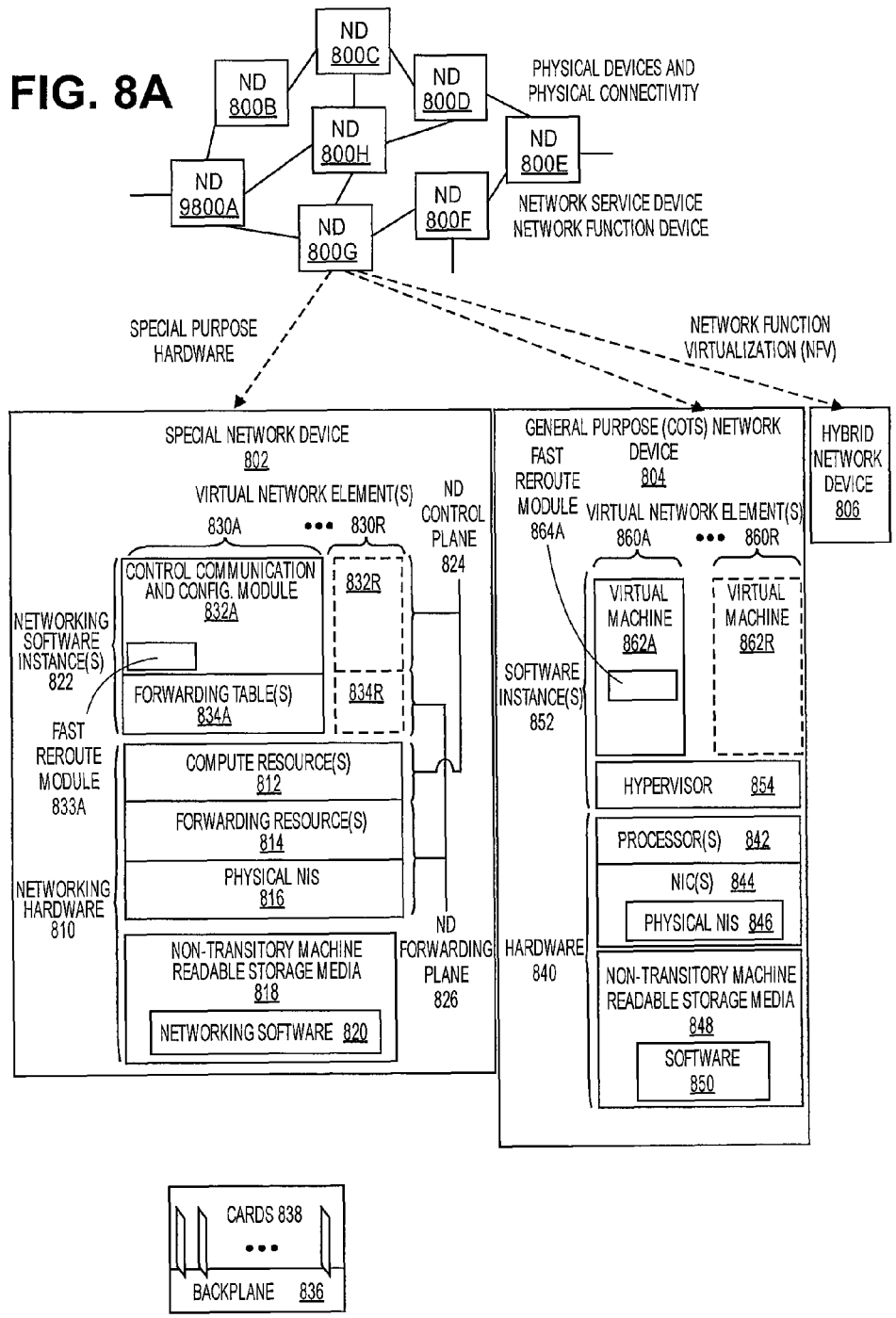
FIG. 8A illustrates connectivity between network devices (NDs) within an exemplary network, as well as three exemplary implementations of the NDs, according to some embodiments of the invention.
FIG. 8B illustrates an exemplary way to implement a special-purpose network device according to some embodiments of the invention.

FIG. 8A illustrates connectivity between network devices (NDs) within an exemplary network, as well as three exemplary implementations of the NDs, according to some embodiments of the invention. FIG. 8A shows NDs 800A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link) An additional line extending from NDs 800A, E, and F illustrates that these NDs act as ingress and egress points for the network (and thus, these NDs are sometimes referred to as edge NDs; while the other NDs may be called core NDs).

Two of the exemplary ND implementations in FIG. 8A are: 1) a special-purpose network device 802 that uses custom application—specific integrated—circuits (ASICs) and a proprietary operating system (OS); and 2) a general purpose network device 804 that uses common off-the-shelf (COTS) processors and a standard OS.

The special-purpose network device 802 includes networking hardware 810 comprising compute resource(s) 812 (which typically include a set of one or more processors), forwarding resource(s) 814 (which typically include one or more ASICs and/or network processors), and physical network interfaces (NIs) 816 (sometimes called physical ports), as well as non-transitory machine readable storage media 818 having stored therein networking software 820. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 800A-H. During operation, the networking software 820 may be executed by the networking hardware 810 to instantiate a set of one or more networking software instance(s) 822. Each of the networking software instance(s) 822, and that part of the networking hardware 810 that executes that network software instance (be it hardware dedicated to that networking software instance and/or time slices of hardware temporally shared by that networking software instance with others of the networking software instance(s) 822), form a separate virtual network element 830A-R. Each of the virtual network element(s) (VNEs) 830A-R includes a control communication and configuration module 832A-R (sometimes referred to as a local control module or control communication module) and forwarding table(s) 834A-R, such that a given virtual network element (e.g., 830A) includes the control communication and configuration module (e.g., 832A), a set of one or more forwarding table(s) (e.g., 834A), and that portion of the networking hardware 810 that executes the virtual network element (e.g., 830A). In some embodiments, the control communication and configuration module 832A-R can implement the fast reroute module 833A. The fast reroute module 833A can implement the functions described herein above with regard to FIGS. 4-6 including installation of rerouting and the handling of upstream and downstream rerouting processes. The fast reroute module 833A can thus encompass the functions of the upstream module and downstream modules discussed herein above.

The special-purpose network device 802 is often physically and/or logically considered to include: 1) a ND control plane 824 (sometimes referred to as a control plane) comprising the compute resource(s) 812 that execute the control communication and configuration module(s) 832A-R; and 2) a ND forwarding plane 826 (sometimes referred to as a forwarding plane, a data plane, or a media plane) comprising the forwarding resource(s) 814 that utilize the forwarding table(s) 834A-R and the physical NIs 816. By way of example, where the ND is a router (or is implementing routing functionality), the ND control plane 824 (the compute resource(s) 812 executing the control communication and configuration module(s) 832A-R) is typically responsible for participating in controlling how data (e.g., packets) is to be routed (e.g., the next hop for the data and the outgoing physical NI for that data) and storing that routing information in the forwarding table(s) 834A-R, and the ND forwarding plane 826 is responsible for receiving that data on the physical NIs 816 and forwarding that data out the appropriate ones of the physical NIs 816 based on the forwarding table(s) 834A-R.

FIG. 8B illustrates an exemplary way to implement the special-purpose network device 802 according to some embodiments of the invention. FIG. 8B shows a special-purpose network device including cards 838 (typically hot pluggable). While in some embodiments the cards 838 are of two types (one or more that operate as the ND forwarding plane 826 (sometimes called line cards), and one or more that operate to implement the ND control plane 824 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 836 (e.g., a first full mesh coupling the line cards and a second full mesh coupling all of the cards).

Returning to FIG. 8A, the general purpose network device 804 includes hardware 840 comprising a set of one or more processor(s) 842 (which are often COTS processors) and network interface controller(s) 844 (NICs; also known as network interface cards) (which include physical NIs 846), as well as non-transitory machine readable storage media 848 having stored therein software 850. During operation, the processor(s) 842 execute the software 850 to instantiate one or more sets of one or more applications, such as fast reroute modules 864A-R. While one embodiment does not implement virtualization, alternative embodiments may use different forms of virtualization—represented by a virtualization layer 854 and software containers 862A-R. For example, one such alternative embodiment implements operating system-level virtualization, in which case the virtualization layer 854 represents the kernel of an operating system (or a shim executing on a base operating system) that allows for the creation of multiple software containers 862A-R that may each be used to execute one of the sets of applications such as fast reroute modules 864A-R. In this embodiment, the multiple software containers 862A-R (also called virtualization engines, virtual private servers, or jails) are each a user space instance (typically a virtual memory space); these user space instances are separate from each other and separate from the kernel space in which the operating system is run; the set of applications running in a given user space, unless explicitly allowed, cannot access the memory of the other processes. Another such alternative embodiment implements full virtualization, in which case: 1) the virtualization layer 854 represents a hypervisor (sometimes referred to as a virtual machine monitor (VMM)) or a hypervisor executing on top of a host operating system; and 2) the software containers 862A-R each represent a tightly isolated form of software container called a virtual machine that is run by the hypervisor and may include a guest operating system. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications such as fast reroute modules 864A-R, as well as the virtualization layer 854 and software containers 862A-R if implemented, are collectively referred to as software instance(s) 852. Each set of applications such as fast reroute modules 864A-R, corresponding software container 862A-R if implemented, and that part of the hardware 840 that executes them (be it hardware dedicated to that execution and/or time slices of hardware temporally shared by software containers 862A-R), forms a separate virtual network element(s) 860A-R.

The virtual network element(s) 860A-R perform similar functionality to the virtual network element(s) 830A-R— e.g., similar to the control communication and configuration module(s) 832A and forwarding table(s) 834A (this virtualization of the hardware 840 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). However, different embodiments of the invention may implement one or more of the software container(s) 862A-R differently. For example, while embodiments of the invention are illustrated with each software container 862A-R corresponding to one VNE 860A-R, alternative embodiments may implement this correspondence at a finer level granularity (e.g., line card virtual machines virtualize line cards, control card virtual machine virtualize control cards, etc.); it should be understood that the techniques described herein with reference to a correspondence of software containers 862A-R to VNEs also apply to embodiments where such a finer level of granularity is used.

In certain embodiments, the virtualization layer 854 includes a virtual switch that provides similar forwarding services as a physical Ethernet switch. Specifically, this virtual switch forwards traffic between software containers 862A-R and the NIC(s) 844, as well as optionally between the software containers 862A-R; in addition, this virtual switch may enforce network isolation between the VNEs 860A-R that by policy are not permitted to communicate with each other (e.g., by honoring virtual local area networks (VLANs)).

The third exemplary ND implementation in FIG. 8A is a hybrid network device 806, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 802) could provide for para-virtualization to the networking hardware present in the hybrid network device 806.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 830A-R, VNEs 860A-R, and those in the hybrid network device 806) receives data on the physical NIs (e.g., 816, 846) and forwards that data out the appropriate ones of the physical NIs (e.g., 816, 846). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 8C illustrates various exemplary ways in which VNEs may be coupled according to some embodiments of the invention. FIG. 8C shows VNEs 870A.1-870A.P (and optionally VNEs 870A.Q-870A.R) implemented in ND 800A and VNE 870H.1 in ND 800H. In FIG. 8C, VNEs 870A.1-P are separate from each other in the sense that they can receive packets from outside ND 800A and forward packets outside of ND 800A; VNE 870A.1 is coupled with VNE 870H.1, and thus they communicate packets between their respective NDs; VNE 870A.2-870A.3 may optionally forward packets between themselves without forwarding them outside of the ND 800A; and VNE 870A.P may optionally be the first in a chain of VNEs that includes VNE 870A.Q followed by VNE 870A.R (this is sometimes referred to as dynamic service chaining, where each of the VNEs in the series of VNEs provides a different service— e.g., one or more layer 4-7 network services). While FIG. 8C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 8A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2 P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 8A may also host one or more such servers (e.g., in the case of the general purpose network device 804, one or more of the software containers 862A-R may operate as servers; the same would be true for the hybrid network device 806; in the case of the special-purpose network device 802, one or more such servers could also be run on a virtualization layer executed by the compute resource(s) 812); in which case the servers are said to be co-located with the VNEs of that ND.

A virtual network is a logical abstraction of a physical network (such as that in FIG. 8A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 8D illustrates a network with a single network element on each of the NDs of FIG. 8A, and within this straight forward approach contrasts a traditional distributed approach (commonly used by traditional routers) with a centralized approach for maintaining reachability and forwarding information (also called network control), according to some embodiments of the invention. Specifically, FIG. 8D illustrates network elements (NEs) 870A-H with the same connectivity as the NDs 800A-H of FIG. 8A.

FIG. 8D illustrates that the distributed approach 872 distributes responsibility for generating the reachability and forwarding information across the NEs 870A-H; in other words, the process of neighbor discovery and topology discovery is distributed.

For example, where the special-purpose network device 802 is used, the control communication and configuration module(s) 832A-R of the ND control plane 824 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 870A-H (e.g., the compute resource(s) 812 executing the control communication and configuration module(s) 832A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 824. The ND control plane 824 programs the ND forwarding plane 826 with information (e.g., adjacency and route information) based on the routing structure(s). For example, the ND control plane 824 programs the adjacency and route information into one or more forwarding table(s) 834A-R (e.g., Forwarding Information Base (FIB), Label Forwarding Information Base (LFIB), and one or more adjacency structures) on the ND forwarding plane 826. For layer 2 forwarding, the ND can store one or more bridging tables that are used to forward data based on the layer 2 information in that data. While the above example uses the special-purpose network device

802, the same distributed approach 872 can be implemented on the general purpose network device 804 and the hybrid network device 806.

FIG. 8D illustrates that a centralized approach 874 (also known as software defined networking (SDN)) that decouples the system that makes decisions about where traffic is sent from the underlying systems that forwards traffic to the selected destination. The illustrated centralized approach 874 has the responsibility for the generation of reachability and forwarding information in a centralized control plane 876 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 876 has a south bound interface 882 with a data plane 80 (sometime referred to the infrastructure layer, network forwarding plane, or forwarding plane (which should not be confused with a ND forwarding plane)) that includes the NEs 870A-H (sometimes referred to as switches, forwarding elements, data plane elements, or nodes). The centralized control plane 876 includes a network controller 878, which includes a centralized reachability and forwarding information module 879 that determines the reachability within the network and distributes the forwarding information to the NEs 870A-H of the data plane 880 over the south bound interface 882 (which may use the OpenFlow protocol). Thus, the network intelligence is centralized in the centralized control plane 876 executing on electronic devices that are typically separate from the NDs.

For example, where the special-purpose network device 802 is used in the data plane 880, each of the control communication and configuration module(s) 832A-R of the ND control plane 824 typically include a control agent that provides the VNE side of the south bound interface 882. In this case, the ND control plane 824 (the compute resource(s) 812 executing the control communication and configuration module(s) 832A-R) performs its responsibility for participating in controlling how data (e.g., packets) is to be routed (e.g., the next hop for the data and the outgoing physical NI for that data) through the control agent communicating with the centralized control plane 876 to receive the forwarding information (and in some cases, the reachability information) from the centralized reachability and forwarding information module 879 (it should be understood that in some embodiments of the invention, the control communication and configuration module(s) 832A-R, in addition to communicating with the centralized control plane 876, may also play some role in determining reachability and/or calculating forwarding information—albeit less so than in the case of a distributed approach; such embodiments are generally considered to fall under the centralized approach 874, but may also be considered a hybrid approach).

While the above example uses the special-purpose network device 802, the same centralized approach 874 can be implemented with the general purpose network device 804 (e.g., each of the VNE 860A-R performs its responsibility for controlling how data (e.g., packets) is to be routed (e.g., the next hop for the data and the outgoing physical NI for that data) by communicating with the centralized control plane 876 to receive the forwarding information (and in some cases, the reachability information) from the centralized reachability and forwarding information module 879; it should be understood that in some embodiments of the invention, the VNEs 860A-R, in addition to communicating with the centralized control plane 876, may also play some role in determining reachability and/or calculating forwarding information—albeit less so than in the case of a distributed approach) and the hybrid network device 806. In fact, the use of SDN techniques can enhance the NFV techniques typically used in the general purpose network device 804 or hybrid network device 806 implementations as NFV is able to support SDN by providing an infrastructure upon which the SDN software can be run, and NFV and SDN both aim to make use of commodity server hardware and physical switches. Thus, for example the fast reroute module 981 can be herein implemented to encompass the functions of FIGS. 4-6 and the upstream and downstream modules discussed herein above.

FIG. 8D also shows that the centralized control plane 876 has a north bound interface 884 to an application layer 886, in which resides application(s) 888. The centralized control plane 876 has the ability to form virtual networks 892 (sometimes referred to as a logical forwarding plane, network services, or overlay networks (with the NEs 870A-H of the data plane 880 being the underlay network)) for the application(s) 888. Thus, the centralized control plane 876 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 8D shows the distributed approach 872 separate from the centralized approach 874, the effort of network control may be distributed differently or the two combined in certain embodiments of the invention. For example: 1) embodiments may generally use the centralized approach (SDN) 874, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 874, but may also be considered a hybrid approach.

While FIG. 8D illustrates the simple case where each of the NDs 800A-H implements a single NE 870A-H, it should be understood that the network control approaches described with reference to FIG. 8D also work for networks where one or more of the NDs 800A-H implement multiple VNEs (e.g., VNEs 830A-R, VNEs 860A-R, those in the hybrid network device 806). Alternatively or in addition, the network controller 878 may also emulate the implementation of multiple VNEs in a single ND. Specifically, instead of (or in addition to) implementing multiple VNEs in a single ND, the network controller 878 may present the implementation of a VNE/NE in a single ND as multiple VNEs in the virtual networks 892 (all in the same one of the virtual network(s) 892, each in different ones of the virtual network(s) 892, or some combination). For example, the network controller 878 may cause an ND to implement a single VNE (a NE) in the underlay network, and then logically divide up the resources of that NE within the centralized control plane 876 to present different VNEs in the virtual network(s) 892 (where these different VNEs in the overlay networks are sharing the resources of the single VNE/NE implementation on the ND in the underlay network).

On the other hand, FIGS. 8E and 8F respectively illustrate exemplary abstractions of NEs and VNEs that the network controller 878 may present as part of different ones of the virtual networks 892. FIG. 8E illustrates the simple case of where each of the NDs 800A-H implements a single NE 870A-H (see FIG. 8D), but the centralized control plane 876 has abstracted multiple of the NEs in different NDs (the NEs 870A-C and G-H) into (to represent) a single NE 8701 in one of the virtual network(s) 892 of FIG. 8D, according to some embodiments of the invention. FIG. 8E shows that in this virtual network, the NE 8701 is coupled to NE 870D and 870F, which are both still coupled to NE 870E.

FIG. 8F illustrates a case where multiple VNEs (VNE 870A.1 and VNE 870H.1) are implemented on different NDs (ND 800A and ND 800H) and are coupled to each other, and where the centralized control plane 876 has abstracted these multiple VNEs such that they appear as a single VNE 870T within one of the virtual networks 892 of FIG. 8D, according to some embodiments of the invention. Thus, the abstraction of a NE or VNE can span multiple NDs.

While some embodiments of the invention implement the centralized control plane 876 as a single entity (e.g., a single instance of software running on a single electronic device), alternative embodiments may spread the functionality across multiple entities for redundancy and/or scalability purposes (e.g., multiple instances of software running on different electronic devices).

Figure 9:
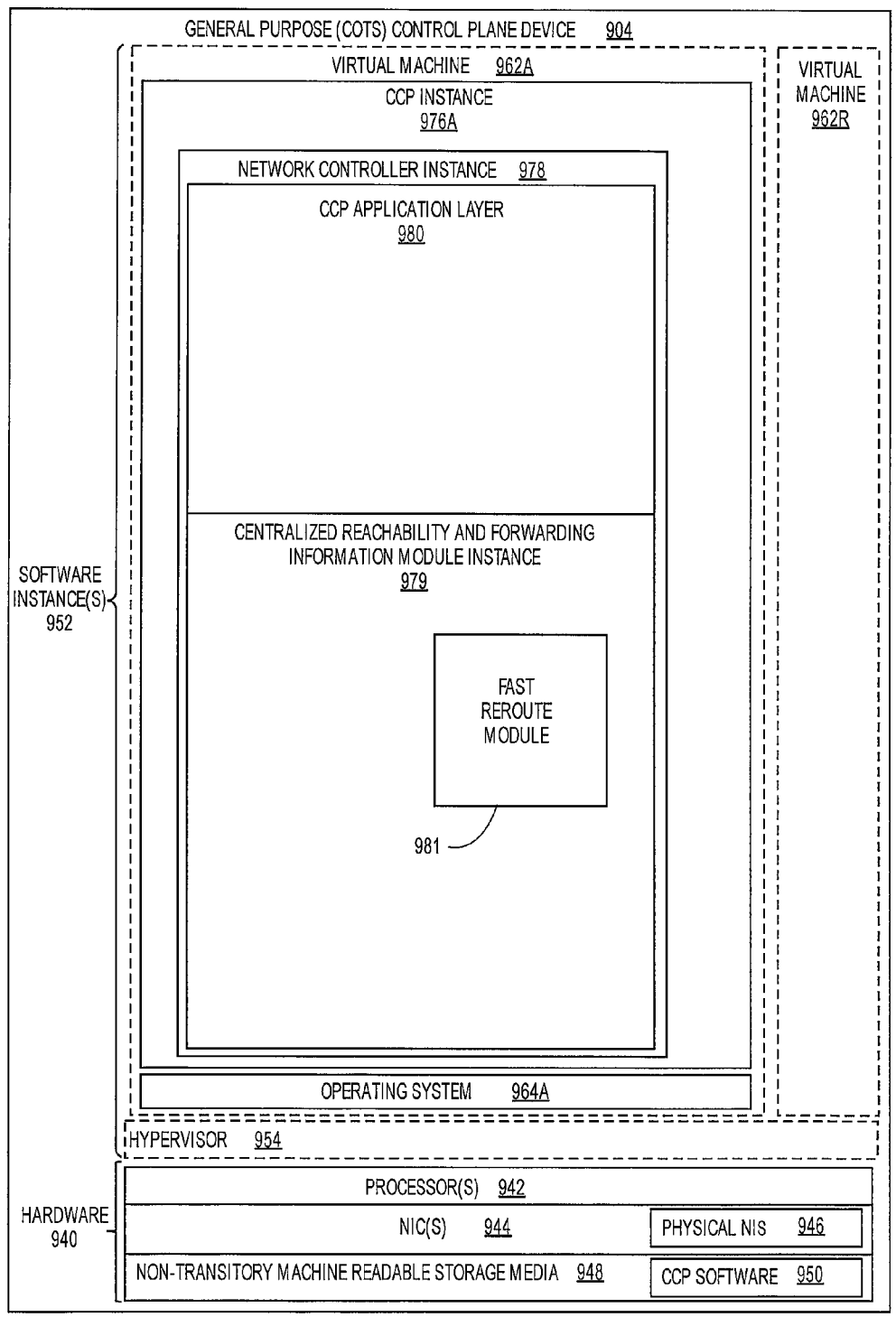
FIG. 9 illustrates a general purpose control plane device with centralized control plane (CCP) software 950), according to some embodiments of the invention.

Similar to the network device implementations, the electronic device(s) running the centralized control plane 876, and thus the network controller 878 including the centralized reachability and forwarding information module 879, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 9 illustrates, a general purpose control plane device 904 including hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein centralized control plane (CCP) software 950.

In embodiments that use compute virtualization, the processor(s) 942 typically execute software to instantiate a virtualization layer 954 and software container(s) 962A-R (e.g., with operating system-level virtualization, the virtualization layer 954 represents the kernel of an operating system (or a shim executing on a base operating system) that allows for the creation of multiple software containers 962A-R (representing separate user space instances and also called virtualization engines, virtual private servers, or jails) that may each be used to execute a set of one or more applications; with full virtualization, the virtualization layer 954 represents a hypervisor (sometimes referred to as a virtual machine monitor (VMM)) or a hypervisor executing on top of a host operating system, and the software containers 962A-R each represent a tightly isolated form of software container called a virtual machine that is run by the hypervisor and may include a guest operating system; with para-virtualization, an operating system or application running with a virtual machine may be aware of the presence of virtualization for optimization purposes). Again, in embodiments where compute virtualization is used, during operation an instance of the CCP software 950 (illustrated as CCP instance 976A) is executed within the software container 962A on the virtualization layer 954. In embodiments where compute virtualization is not used, the CCP instance 976A on top of a host operating system is executed on the "bare metal" general purpose control plane device 904. The instantiation of the CCP instance 976A, as well as the virtualization layer 954 and software containers 962A-R if implemented, are collectively referred to as software instance(s) 952.

In some embodiments, the CCP instance 976A includes a network controller instance 978. The network controller instance 978 includes a centralized reachability and forwarding information module instance 979 (which is a middleware layer providing the context of the network controller 878 to the operating system and communicating with the various NEs), and an CCP application layer 980 (sometimes referred to as an application layer) over the middleware layer (providing the intelligence required for various network operations such as protocols, network situational awareness, and user—interfaces). At a more abstract level, this CCP application layer 980 within the centralized control plane 876 works with virtual network view(s) (logical view(s) of the network) and the middleware layer provides the conversion from the virtual networks to the physical view. In one embodiment, a fast reroute module 981 is implemented as part of the centralized reachability and forwarding information module instance. In other embodiments, the fast reroute module 1081 can be implemented as part of the CCP application layer 980 or similarly implemented as part of an SDN implementation.

The centralized control plane 876 transmits relevant messages to the data plane 880 based on CCP application layer 980 calculations and middleware layer mapping for each flow. A flow may be defined as a set of packets whose headers match a given pattern of bits; in this sense, traditional IP forwarding is also flow—based forwarding where the flows are defined by the destination IP address for example; however, in other implementations, the given pattern of bits used for a flow definition may include more fields (e.g., 10 or more) in the packet headers. Different NDs/NEs/VNEs of the data plane 880 may receive different messages, and thus different forwarding information. The data plane 880 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched).

Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 880, the packet (or a subset of the packet header and content) is typically forwarded to the centralized control plane 876. The centralized control plane 876 will then program forwarding table entries into the data plane 880 to accommodate packets belonging to the flow of the unknown packet. Once a specific forwarding table entry has been programmed into the data plane 880 by the centralized control plane 876, the next packet with matching credentials will match that forwarding table entry and take the set of actions associated with that matched entry.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computing device functioning as a network node in a multicast communication network, the multicast communication network including a multicast tree to provide connectivity from a common source node to one or more multicast recipient nodes, the multicast communication network further including a set of secondary paths to provide redundancy to the multicast tree, the computing device to execute a plurality of virtual machines for implementing network function virtualization (NFV), wherein a virtual machine from the plurality of virtual machines is configured to implement a method for an enhanced fast re-route mechanism to provide increased failure coverage to the multicast communication network, the computing device comprising:
 a non-transitory computer-readable medium having stored therein a fast reroute module; and
 a processor coupled to the non-transitory computer-readable medium, the processor is configured to execute a virtual machine from the plurality of virtual machines, the virtual machine is configure to execute the fast reroute module, the fast reroute module is configured to detect a loss of connection at an incoming interface to an upstream neighbor, to determine that the network node cannot re-route the multicast data traffic to allow the multicast data traffic to reach the multicast recipient nodes, to send a downstream fast notification packet (DFNP) from the network node downstream towards the multicast recipient nodes, wherein the DFNP causes a downstream merge node to switch reception of the multicast data traffic to a secondary path that leads to the common source node, to receive an upstream fast notification packet (UFNP) from the downstream merge node by the network node, and to modify forwarding information of the network node upon receipt of the UFNP such that the multicast data traffic is to be received by the network node from a downstream neighbor of the network node via which the UFNP was received, wherein the DFNP and the UFNP cause the multicast data traffic to reverse a direction of flow between the network node and the downstream merge node to thereby re-route the multicast data traffic.

2. The computing device of claim 1, wherein the downstream merge node is coupled to a primary upstream multicast hop (UMH) on a primary path to the common source node and a secondary UMH on the secondary path to the common source node, the fast reroute module further configured to select the second UMH based on Equal Cost MultiPath (ECMP) or Loop Free Alternate (LFA).

3. The computing device of claim 1, wherein the computing device includes a forwarding table in memory that records a list of original outgoing interfaces (OIFs) and a list of original incoming interfaces (IIFs) of the computing device, and wherein, prior to the detecting the loss of connection, the fast reroute module is further configured to expand the list of original IIFs in the forwarding table to form an expanded list of IIFs that include all of the original IIFs and all of the original OIFs, to expand the list of original OIFs in the forwarding table to form an expanded list of OIFs that include all of the original IIFs and all of the original OIFs, to mark all of the IIFs in the expanded list of IIFs as blocked except an original IIF that leads to the primary upstream neighbor of the network node, and to mark all of the original IIFs in the expanded list of OIFs as blocked.

4. The computing device of claim 1, wherein a set of intermediate nodes are located between the network node and the downstream merge node, and wherein the DFNP causes each intermediate node to unblock one or more OIFs that lead to one or more upstream neighbors of the intermediate node, and to block a currently-unblocked OIF.

5. The computing device claim 1, wherein the DFNP causes the downstream merge node to unblock an OIF leading to a primary upstream neighbor of the downstream merge node, to unblock an IIF leading to a secondary upstream neighbor of the downstream merge node, and to block a currently-unblocked IIF.

6. The computing device of claim 1, wherein a set of intermediate nodes are located between the network node and the downstream merge node, wherein the UFNP causes each intermediate node to unblock an IIF to a downstream neighbor of the intermediate node from which the UFNP was received, and to block a currently-unblocked IIF.

7. The computing device of claim 1, wherein determining the loss of connection by the fast reroute module further includes determining that the network node does not have a secondary path coupling the common source node to the network node, determining that the network node receives an indication of failure from the secondary path, or determining that the network node detects failure at an IIF coupled to a secondary upstream neighbor on the secondary path.

8. The computing device of claim 1, wherein processing of the DFNP and the UFNP is based on the forwarding information stored by the network node in a dataplane.

9. The method of claim 1, wherein the DFNP is not forwarded further downstream when the DFNP reaches the downstream merge node.

10. The method of claim 1, wherein the UFNP is not forwarded further upstream when the UFNP reaches the network node.

11. A control plane device to implement a control plane of a software defined networking (SDN) network including a plurality of network devices implementing the data plane of the SDN network, wherein control plane device is configured to execute a method for an enhanced fast re-route mechanism to provide increased failure coverage to a multicast communication network relative to a network node, the multicast communication network including a multicast tree to provide connectivity from a common source node to one or more multicast recipient nodes, the multicast communication network further including a set of secondary paths to provide redundancy to the multicast tree, the control plane device comprising:
 a non-transitory computer-readable medium having stored therein a fast reroute module; and
 a processor coupled to the non-transitory computer-readable medium, the processor configured to execute the fast reroute module, the fast reroute module configured to detect a loss of connection at an incoming interface to an upstream neighbor, to determine that the network node cannot re-route the multicast data traffic to allow the multicast data traffic to reach the multicast recipient nodes, to send a downstream fast notification packet (DFNP) from the network node downstream towards the multicast recipient nodes, wherein the DFNP causes a downstream merge node to switch reception of the multicast data traffic to a secondary path that leads to the common source node, to receive an upstream fast notification packet (UFNP) from the downstream merge node by the network node, and to modify forwarding information of the network node upon receipt of the UFNP such that the multicast data traffic is to be received by the network node from a downstream neighbor of the network node via which the UFNP was received, wherein the DFNP and the UFNP cause the multicast data traffic to reverse a direction of flow between the network node and the downstream merge node to thereby re-route the multicast data traffic.

12. The control plane device of claim 11, wherein the downstream merge node is coupled to a primary upstream multicast hop (UMH) on a primary path to the common source node and a secondary UMH on the secondary path to the common source node, the fast reroute module further configured to select the second UMH based on Equal Cost MultiPath (ECMP) or Loop Free Alternate (LFA).

13. The control plane device of claim 11, wherein the computing device includes a forwarding table in memory that records a list of original outgoing interfaces (OIFs) and a list of original incoming interfaces (IIFs) of the computing device, and wherein, prior to the detecting the loss of connection, the fast reroute module is further configured to expand the list of original IIFs in the forwarding table to form an expanded list of IIFs that include all of the original IIFs and all of the original OIFs, to expand the list of original OIFs in the forwarding table to form an expanded list of OIFs that include all of the original IIFs and all of the original OIFs, to mark all of the IIFs in the expanded list of IIFs as blocked except an original IIF that leads to the primary upstream neighbor of the network node, and to mark all of the original IIFs in the expanded list of OIFs as blocked.

14. The control plane device of claim 11, wherein a set of intermediate nodes are located between the network node and the downstream merge node, and wherein the DFNP causes each intermediate node to unblock one or more OIFs that lead to one or more upstream neighbors of the intermediate node, and to block a currently-unblocked OIF.

15. The control plane device claim 11, wherein the DFNP causes the downstream merge node to unblock an OIF leading to a primary upstream neighbor of the downstream merge node, to unblock an IIF leading to a secondary upstream neighbor of the downstream merge node, and to block a currently-unblocked IIF.

16. The control plane device of claim 11, wherein a set of intermediate nodes are located between the network node and the downstream merge node, wherein the UFNP causes each intermediate node to unblock an IIF to a downstream neighbor of the intermediate node from which the UFNP was received, and to block a currently-unblocked IIF.

17. The control plane device of claim 11, wherein determining the loss of connection by the fast reroute module further includes determining that the network node does not have a secondary path coupling the common source node to the network node, determining that the network node receives an indication of failure from the secondary path, or determining that the network node detects failure at an IIF coupled to a secondary upstream neighbor on the secondary path.

18. The control plane device of claim 11, wherein processing of the DFNP and the UFNP is based on the forwarding information stored by the network node in a data plane.

19. The control plane device of claim 11, wherein the DFNP is not forwarded further downstream when the DFNP reaches the downstream merge node.

20. The control plane device of claim 11, wherein the UFNP is not forwarded further upstream when the UFNP reaches the network node.

* * * * *